United States Patent
Nakata et al.

(10) Patent No.: US 8,407,811 B2
(45) Date of Patent: Mar. 26, 2013

(54) SCANNING PROBE MICROSCOPE AND METHOD OF OBSERVING SAMPLE USING THE SAME

(75) Inventors: Toshihiko Nakata, Hiratsuka (JP); Masahiro Watanabe, Yokohama (JP); Takashi Inoue, Yokohama (JP); Kishio Hidaka, Hitachioota (JP); Makoto Okai, Tokorozawa (JP); Motoyuki Hirooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 12/712,745

(22) Filed: Feb. 25, 2010

(65) Prior Publication Data

US 2010/0218287 A1    Aug. 26, 2010

(30) Foreign Application Priority Data

Feb. 25, 2009    (JP) ................ 2009-042242

(51) Int. Cl.
 *G01Q 60/24* (2010.01)
(52) U.S. Cl. ........... 850/33; 850/21; 850/22; 850/24; 850/30; 850/52; 850/56; 850/57; 850/58
(58) Field of Classification Search ........... 850/21, 850/22, 24, 30, 33, 52, 56, 57, 58
 See application file for complete search history.

(56) References Cited

U.S. PATENT DOCUMENTS

| | | | |
|---|---|---|---|
| 7,391,564 B2 | 6/2008 | Komiyama et al. | |
| 7,511,270 B2 | 3/2009 | Nakayama et al. | |
| 8,272,068 B2 | 9/2012 | Nakata et al. | |
| 2010/0325761 A1* | 12/2010 | Nakata et al. | 850/33 |

FOREIGN PATENT DOCUMENTS

| | | |
|---|---|---|
| JP | 2002-267590 | 9/2002 |
| JP | 2004-28900 | 1/2004 |
| JP | 2005-083857 | 3/2005 |
| JP | 2006-515682 | 6/2006 |
| JP | 2008-256672 | 10/2008 |
| WO | WO 2004/048285 A1 | 6/2004 |

OTHER PUBLICATIONS

Togar Pangaribuan et al.; Reproducible Fabrication Technique of Nanometric Tip Diameter Fiber Probe for Photon Scanning Tunneling Microscope, jpn. J. Appl. Phys. Sep. 1, 1992, pp. L1302-L 1304, vol. 31 Part 2, No. 9A.
Yasushi Inouye et al., Near-field scanning optical microscope with a metallic probe tip, Optics Letters, Feb. 1, 1994, pp. 159161, vol. 19, No. 3.
Japanese Office Action dated Sep. 25, 2012; Application No. 2009-042242.
Japanese Office Action dated Dec. 11, 2012; Application No. 2009-042242.

* cited by examiner

*Primary Examiner* — Michael Maskell
*Assistant Examiner* — Hanway Chang
(74) *Attorney, Agent, or Firm* — Antonelli, Terry, Stout & Kraus, LLP.

(57) ABSTRACT

In a scanning probe microscope, a nanotube and metal nanoparticles are combined together to configure a plasmon-enhanced near-field probe having an optical resolution on the order of nanometers as a measuring probe in which a metal structure is embedded, and this plasmon-enhanced near-field probe is installed in a highly-efficient plasmon exciting unit to repeat approaching to and retracting from each measuring point on a sample with a low contact force, so that optical information and profile information of the surface of the sample are measured with a resolution on the order of nanometers, a high S/N ratio, and high reproducibility without damaging both of the probe and the sample.

16 Claims, 23 Drawing Sheets

FIG. 18

| MATERIAL | $\lambda_1$ | $\lambda_2$ | $\lambda_3$ |
|---|---|---|---|
| Si | $I_{11}$ | $I_{21}$ | $I_{31}$ |
| $SiO_2$ | $I_{12}$ | $I_{22}$ | $I_{32}$ |
| $Si_3N_4$ | $I_{13}$ | $I_{23}$ | $I_{33}$ |
| Poly-Si | $I_{14}$ | $I_{24}$ | $I_{34}$ |
| W | $I_{15}$ | $I_{25}$ | $I_{35}$ |
| Al | $I_{16}$ | $I_{26}$ | $I_{36}$ |
| Cu | $I_{17}$ | $I_{27}$ | $I_{37}$ |
| ⋮ | ⋮ | ⋮ | ⋮ |

SCANNING PROBE MICROSCOPE AND METHOD OF OBSERVING SAMPLE USING THE SAME

CROSS-REFERENCE TO RELATED APPLICATION

The present application claims priority from Japanese Patent Application No. JP 2009-042242 filed on Feb. 25, 2009, the content of which is hereby incorporated by reference into this application.

TECHNICAL FIELD OF THE INVENTION

The present invention relates to a scanning probe microscope technique and a technique effectively applied to a method of observing a sample using the scanning probe microscope.

BACKGROUND OF THE INVENTION

Scanning probe microscopes (SPMs) have been known as a technique of measuring a fine three-dimensional shape. Among the scanning probe microscopes, anatomic force microscope (AFM) is an observation technique of scanning a surface of a sample while keeping a contact force at a very small value by controlling a probe with a pointed tip, and is widely used as a technique measurable for a fine three-dimensional shape on the order of atom. However, this atomic force microscope cannot measure optical properties, such as reflectance distribution and refractive-index distribution, of the surface of the sample.

Meanwhile, employment of a strained silicon for an ultra-micro semiconductor device of a 45-nm node and beyond has been planed for achieving high speed, and measurement of stress distribution in a minute region is absolutely necessary for yield management. Also, for further microfabrication, it is required to finely manage a state of impurity-atom distribution by a resolution on the order of nanometers. Physical property information such as stress distribution and impurity distribution cannot be measured by an atomic force microscope or a critical-dimension scanning electron microscope (CD-SEM) used for dimension management. While an optical method such as Raman spectroscopy has been studied, a conventional Raman microscope does not have enough spatial resolution.

Also, in order to specify a cause for occurrence of foreign particles detected in foreign-particle inspection or defects detected in defect inspection, operations for classifying the foreign particles and defects are performed by an electron microscope called a review SEM. However, since this method relies only on their shape and profile information, classification performance of the method has approached to its limit. Although improvement of this classification performance can be expected by adding optical information also in the method, a conventional optical microscope or laser scanning microscope does not have enough spatial resolution after all.

As means to measure optical-property and physical-property information of the surface of the sample with high resolution to solve these problems, a scanning near-field optical microscope (SNOM) is known. As disclosed in Japanese Journal of Applied Physics, Vol. 31, pp. L1302-L1304, 1992 (Non-Patent Document 1), this microscope measures optical properties, such as reflectance distribution and refractive-index distribution, of the surface of the sample with a resolution of several tens of nm equal to an aperture size over an optical diffraction limit by scanning the near-field light leaking from a fine aperture of several tens of nm as keeping a distance between the aperture and the sample by the same several tens of nm (aperture probe). As a similar method, Optics Letters, Vol. 19, pp. 159-161, 1994 (Non-Patent Document 2) discloses a method (scattering probe) of irradiating external light to a metal probe and scanning near-field light having a magnitude of several tens of nm scattered at a microtip portion of the probe.

Further, Journal of the spectroscopical research of Japan, Vol. 54, No. 4, pp. 225-237, 2005 (Non-Patent Document 3) discloses that surface plasmon excited on a metal surface by fine spot light propagates through the metal surface.

Still further, Japanese Patent Application Laid-Open Publication (Translation of PCT Application) No. 2006-515682 (Patent Document 1) discloses a method of forming fine spot light by providing a fine spherical lens at a fiber tip.

Still further, Japanese Patent Application Laid-Open Publication No. 2002-267590 (Patent Document 2) discloses a method of obtaining fine spot light by filling a metal carbide made of V, Y, Ta, Sb, or others having photoluminescence or electroluminescence characteristics, a ZnS fluorescent material, or a CaS fluorescent material inside a carbon nanotube.

SUMMARY OF THE INVENTION

However, measurement resolution of the above-described scanning near-field optical microscope is the order of several tens of nm, and the resolution is lower, by an order of magnitude or more, than those of an atomic force microscope and electron microscope having a resolution on the order of nm. Also, the scanning near-field optical microscope has a problem of extremely-low measurement repeatability which is critical for industrial application. That is, in the method using an aperture probe among the methods described above, it is extremely difficult to stably form the aperture, and the aperture is practically limited to several tens of nm. Further, the tip portion is damaged or worn by hitting of the probe to the sample when scanning over the sample to widen the aperture, and therefore, reproducibility of the measured image is decreased.

On the other hand, while the scattering probe using a metal probe has a higher resolution than that of the aperture probe, the scattering probe has problems that external lighting is scattered on a base of the probe or the surface of the sample to become background noise, or that the tip portion is damaged or worn by hitting of the probe to the sample when scanning over the sample similar to the aperture probe, and therefore, the measurement resolution is decreased and sufficient reproducibility cannot be obtained.

Still further, also in the method of forming the fine spherical lens at the fiber tip, the resolution is on the order of several tens of nm or more in principle, and the spherical lens is damaged or worn by hitting of the spherical lens to the sample when scanning over the sample to gradually increase the spot light so as to degrade its shape, and therefore, reproducibility of the measured image is decreased.

Still further, also in the method of filling luminescent particles having photoluminescence or electroluminescence characteristics inside the carbon nanotube, its luminescent efficiency is extremely decreased when a particle diameter is on the order of nanometers, and therefore, it is difficult to obtain a near-field optical image with a high S/N (signal/noise) ratio.

The present invention is to provide a scanning probe microscope measurable for optical and profile information of the surface of the sample with a resolution on the order of nanometers, a high S/N ratio, and high reproducibility without damaging both of the probe and the sample.

Also, the present invention is to achieve high-yield production of a high-reliable semiconductor device by measuring physical property information such as stress distribution and impurity distribution of a semiconductor sample and optical and profile information contributing to classification of foreign particles and defects with resolution on the order of nanometers, and then feeding the information back to manufacturing process conditions.

The novel characteristics of the present invention will be apparent from the description of the present specification and the accompanying drawings.

The typical ones of the inventions disclosed in the present application will be briefly described as follows.

That is, according to the typical one, a scanning probe microscope includes: a measuring probe in which a metal structure is embedded; a cantilever supporting the measuring probe; a cantilever driving means driving the cantilever to relatively and three-dimensionally scan a test-target sample with the measuring probe; a displacement detecting means detecting deformation of the cantilever; and a near-field optical image obtaining means generating near-field light between the measuring probe and a surface of the test-target sample to obtain a near-field optical image of the surface of the test-target sample.

And, the scanning probe microscope further includes AFM image generating means generating an atomic force microscopic image (AFM image) of the surface of the test-target sample by processing a signal obtained by the detection of the deformation of the cantilever by the displacement detecting means.

And, the near-field optical image obtaining means includes plasmon exciting means exciting plasmon at one end of the measuring probe. More specifically, it includes a plasmon exciting unit exciting plasmon from far-field light at an incident end of the measuring probe and propagating the plasmon toward an emission end of the measuring probe to output the plasmon as the near-field light.

Also, a method of observing the sample using the scanning probe microscope includes the steps of: driving the cantilever supporting the measuring probe in which the metal structure is embedded; relatively and three-dimensionally scanning the test-target sample with the measuring probe; optically detecting the deformation of the cantilever due to the three-dimensional scanning; and obtaining the near-field optical image of the surface of the test-target sample by using the measuring probe.

And, the method further includes the step of generating the atomic force microscopic image (AFM image) of the surface of the test-target sample by processing the signal obtained by the detection of the deformation of the cantilever.

And, to obtain the near-field optical image, plasmon is excited at the one end of the measuring probe. More specifically, the method includes the steps of: exciting plasmon from the far-field light at the incident end of the measuring probe; propagating the plasmon toward the emission end of the measuring probe; and outputting the plasmon as the near-field light.

These features and advantages of the invention will be apparent from the following more particular description of preferred embodiments of the invention, as illustrated in the accompanying drawings.

BRIEF DESCRIPTIONS OF THE DRAWINGS

FIG. 18 is a schematic diagram illustrating a combination data of various materials with reflection-light intensity with respect to each light-source wavelength according to the first embodiment of the present invention;

Figure 23:
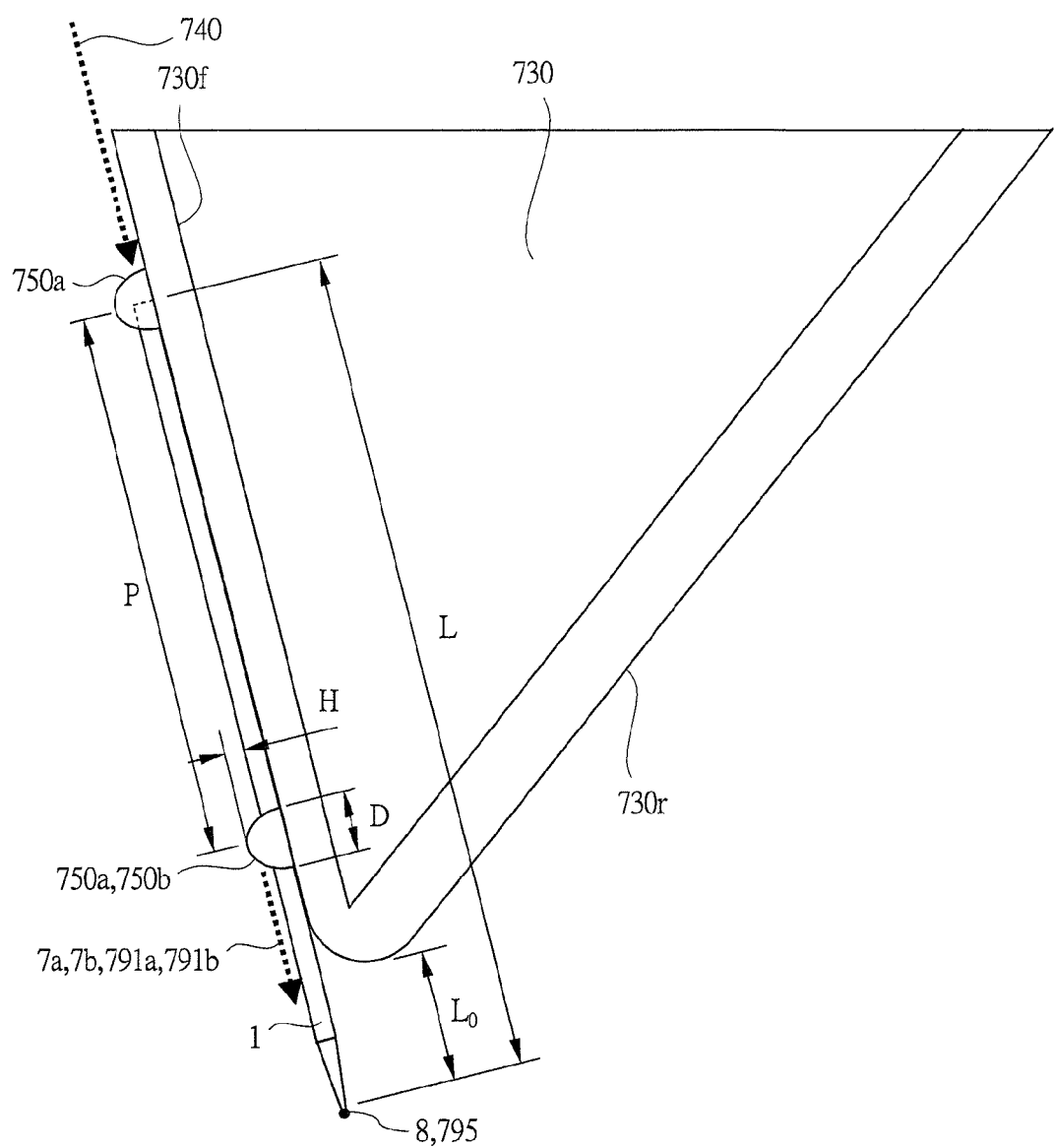
Figure 24:
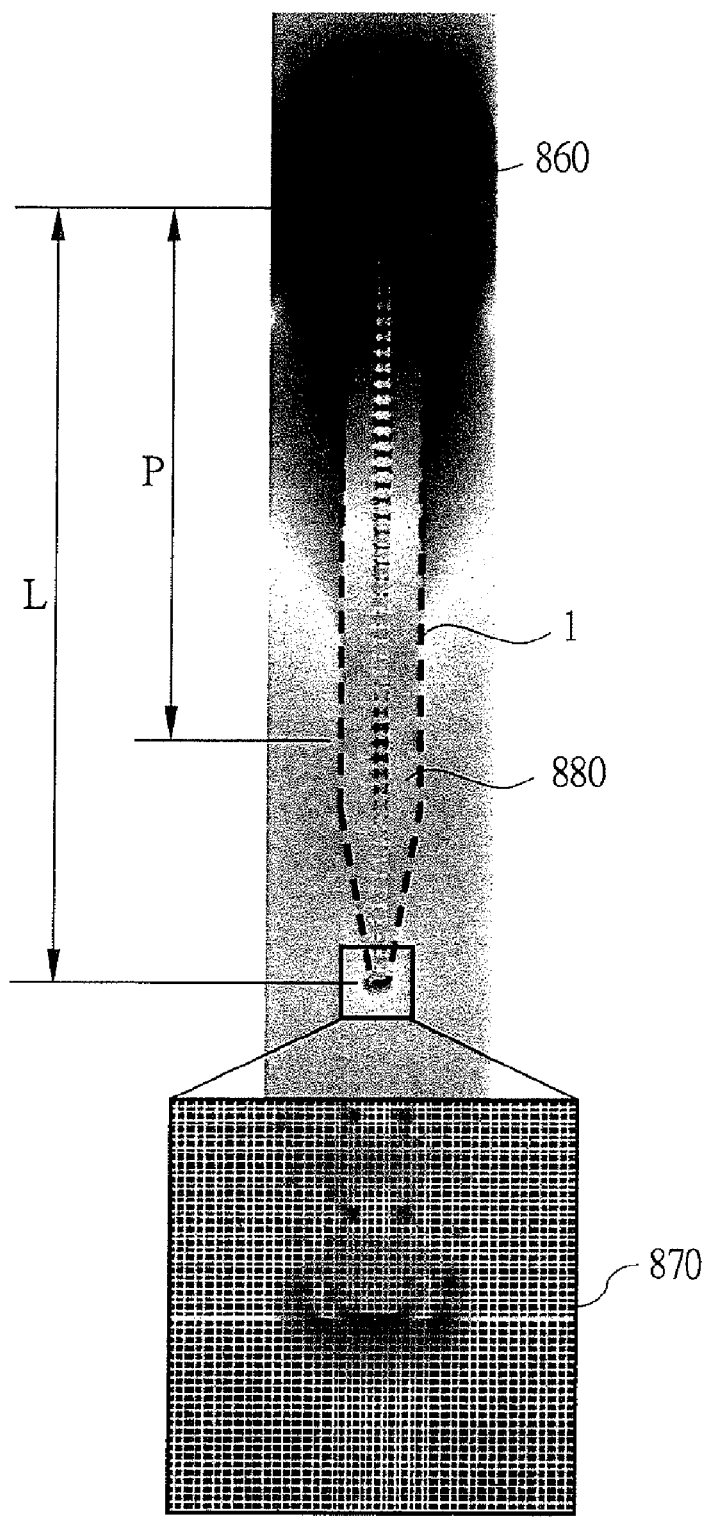

FIG. 23 is a cross-sectional view illustrating a method of fixing a nanotube to a chip and a principle of guiding an excited TM mode plasmon to a nanotube in a plasmon exciting unit according to a fourth embodiment of the present invention; and FIG. 24 illustrates an electric-field distribution in a vicinity of an inside and a surface of a carbon nanotube obtained by a computer simulation when a point light source having a wavelength of 886 nm is disposed at a top end portion in the carbon nanotube having an outer diameter of 20 nm in which gold nano-particles each having a diameter of 4 nm are filled, according to the fourth embodiment of the present invention.

DESCRIPTIONS OF THE PREFERRED EMBODIMENTS

Outline of Embodiments

It is known that, when light is irradiated to metal particles, surface plasmon occurs in which free electrons in the metal collectively vibrate, and evanescent light caused on surfaces of the metal particles by the irradiated light is coupled with the surface plasmon, so that plasmon resonance is generated to cause light absorption and a significantly local-enhanced electric field. In embodiments of the present invention, there is manufactured a probe generating the significantly local-enhanced electric field (near-field light) at a tip portion of the probe, and an optical state of a surface of a sample is observed or measured by using the probe.

The probe according to embodiments of the present invention is formed of a measuring probe in which a metal structure is embedded. Although described in detail in each embodiment later, for example, the probe is formed of a carbon nanotube or a metal nanotube, and gold particles (gold nano-particles), silver particles (silver nano-particles), a gold rod (gold nano-rod), or a silver rod (silver nano-rod) are/is embedded inside the carbon nanotube or the metal nanotube. Alternatively, the probe is formed of a carbon nanotube or a metal nanotube, a tip portion of the carbon nanotube or the metal nanotube approaching to a surface of a test-target sample is sharpened, and gold particles (gold nano-particles) or silver particles (silver nano-particles) are embedded inside the tip portion.

Although described in detail in each embodiment later, a scanning probe microscope according to an embodiment of the present invention includes:
the above-described measuring probe (nanotube 1) in which a metal structure is embedded; a cantilever (201) supporting the measuring probe; cantilever driving means (XYZ piezoelectric element actuator 204) driving the cantilever to relatively and three-dimensionally scan a test-target sample with the measuring probe; displacement detecting means (four-split position sensor 209) detecting deformation of the cantilever; and near-field optical image obtaining means (measuring unit 2000) generating near-field light between the measuring probe and a surface of the test-target sample to obtain a near-field optical image of the surface of the test-target sample.

And, the scanning probe microscope further includes AFM image generating means (image forming unit 410) generating an AFM image of the surface of the test-target sample by processing a signal obtained by the detection of the deformation of the cantilever by the displacement detecting means.

And, the near-field optical image obtaining means further includes: plasmon exciting means (plasmon exciting unit 200) exciting plasmon at one end of the measuring probe; a near-field light detection optical system (detection optical system 4000) detecting the near-field light caused between the other end of the measuring probe and the surface of the test-target sample by the approach of the other end of the measuring probe to the surface of the test-target sample in plasmon excitation state by the plasmon exciting means; and a near-field optical image processing system (control unit 6000) processing a signal obtained by the detection of the near-field light in the near-field light detection optical system to obtain a near-field optical image of the surface of the test-target sample.

Also, a method of observing the sample according to an embodiment of the present invention by using the above-described scanning probe microscope includes the steps of: relatively and three-dimensionally scanning the test-target sample by the measuring probe; optically detecting a deformation of the cantilever due to the three-dimensional scanning; and obtaining the near-field optical image of the surface of the test-target sample by using the measuring probe.

Hereinafter, embodiments of the present invention will be described in detail with reference to the accompanying drawings based on the above-described outline of embodiments. Note that components having the same function are denoted by the same reference symbols throughout the drawings for describing the embodiment, and the repetitive description thereof will be omitted. Also, in each drawing, cross-sectional notations may be omitted for easily seeing illustration contents even in cross-sectional views.

First Embodiment

A first embodiment of the present invention is described with reference to FIGS. 1 to 20.

Figure 1:
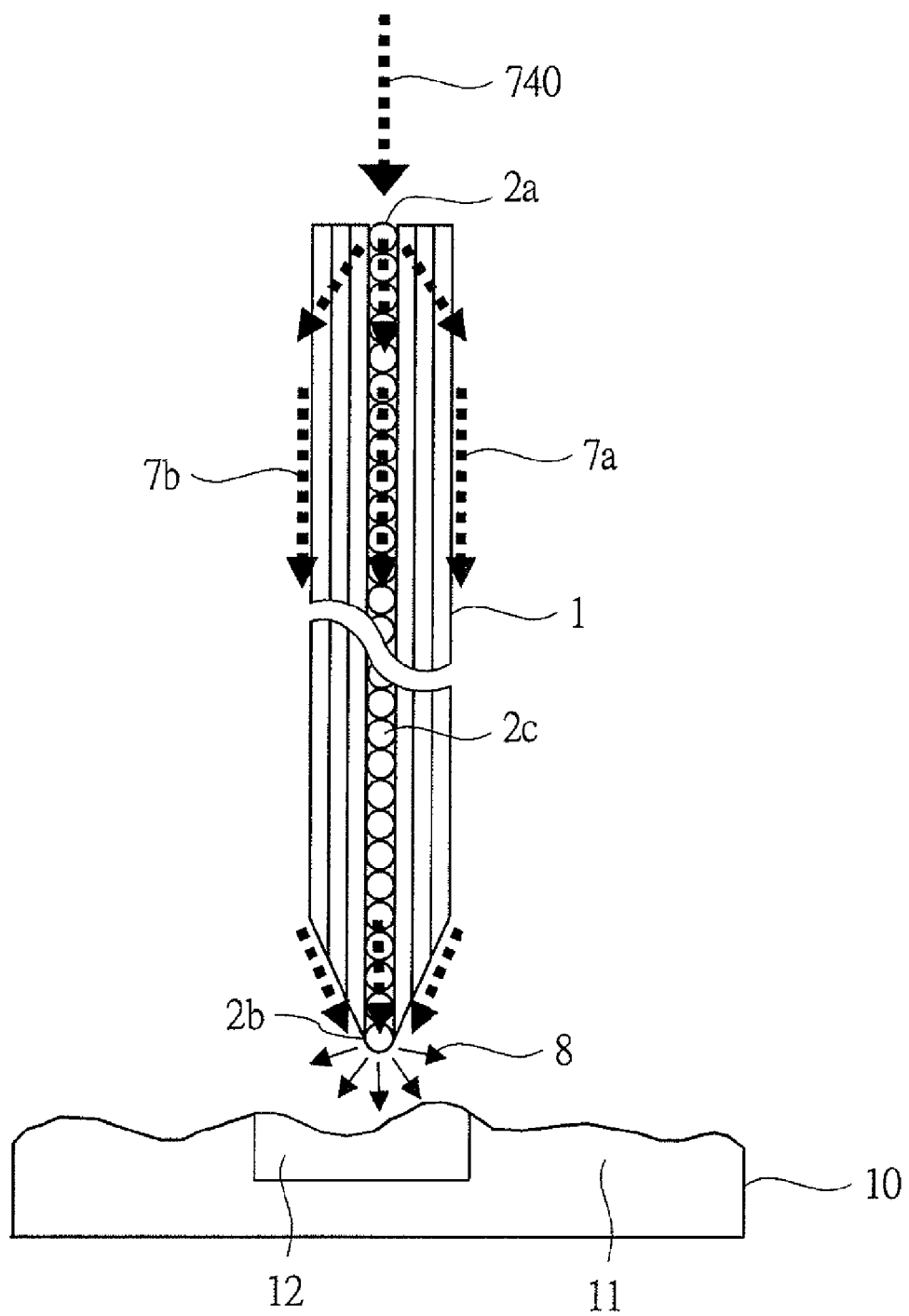
FIG. 1 is a cross-sectional view of a front surface of a plasmon-enhanced near-field probe according to a first embodiment of the present invention.

First, a configuration of a plasmon-enhanced near-field probe according to the present embodiment is described with reference to FIGS. 1 to 3. In the present embodiment, as illustrated in FIG. 1, the plasmon-enhanced near-field probe is formed by sharpening a bottom end portion in a nanotube 1 as a circular cone shape, the nanotube 1 such as a multilayered carbon nanotube (CNT), a metal nanotube, or a boron nitride (BN) nanotube having properties as an insulator, and by filling spherical gold nano-particles 2 (2a, 2c, and 2b) made of gold (Au) in a top end portion, an inside, and a bottom end portion of a hollow portion inside the nanotube 1.

For example, a voltage is applied to both ends of the nanotube, 1 such as a carbon nanotube, and a current is saturated in time as increasing the applied voltage. As further increasing the applied voltage, the current is decreased step by step, so that outer layers of the nanotube 1 are peeled off one by one to thin the nanotube 1 and finally cut off the nanotube 1 at its center. By this process, the tip portion of the nanotube 1 can be sharpened. Also, in a method of filling the gold nano-particles 2, for example, it is possible to contain the gold nano-particles 2 inside the nanotube 1 by applying capillary action caused by thermally reacting the gold nano-particles 2 and the nanotube 1 whose both ends are opened in a vacuum chamber with applying high-voltage current or heat. A technique as published on, for example, the web (http://www1.accsnet.ne.jp/~kentaro/yuuki/nanotube/nanotube2.html) can be applied for this capillary action.

In the present embodiment, a length of the nanotube 1 is 1 μm, an outer diameter thereof is 20 nm, and an inner diameter of the hollow portion thereof is 4 nm. Diameters of the gold nano-particles 2a, 2c, and 2b are 4 nm. Here, diameters of the metal particles generating plasmon are regarded as 1 nm as a limit diameter or larger, and therefore, a preferred aim of the present invention can be achieved as long as the gold nano-particles 2 has a diameter of 1 nm or larger. In the present embodiment, 4 nm is set as a limit diameter of the gold nano-particles relatively stably manufactured. However, in the present invention, the diameter of the gold nano-particles 2 is not limited to 4 nm, and the preferred aim of the present invention can be achieved as long as the diameter is within a range of about 1 nm to 20 nm. In this case, the outer diameter of the nanotube 1 has to be changed in accordance with the diameter of the gold nano-particles 2. Also, although a case of using gold as the metal particle is described in embodiments below, similar effects can be obtained even in a nano-particle made of other types of metal such as silver nano-particle.

If surface plasmon 740 can be guided to the top end portion in the nanotube 1 by any means, this surface plasmon 740 propagates from the top end portion to the bottom end portion through the gold nano-particles 2a, 2c, and 2b filled in the surface side and the inside of the nanotube 1 as illustrated by dashed arrows 7a and 7b. Since the bottom end portion in the nanotube 1 is sharpened as a circular cone shape, the electric field intensity is locally enhanced to excite strong localized plasmon in the gold nano-particles 2b at the bottom end portion in the nanotube 1. This localized plasmon interacts with a surface structure of a sample 10 to cause a strong resonance phenomenon, so that the minute near-field light spot 8 is generated. A spot diameter of the near-field light 8 is 4 nm almost equal to the diameter of the gold nano-particles 2b when the gold nano-particles 2b approaches closest to the sample 10. That is, the probe relatively and two-dimensionally scans on the sample, so that, for example, regions 11 and 12 having a different reflectivity from each other of the sample 10 can be identified with an optical resolution of 4 nm. Practically, far-field light is caused by the interaction between the near-field light 8 and the sample 10, and therefore, optical characteristics and spectral characteristics of a surface of the sample 10 can be imaged with the optical resolution of 4 nm by detecting this far-field light. Note that the regions 11 and 12 cannot be identified by an atomic force microscope.

Figure 2:
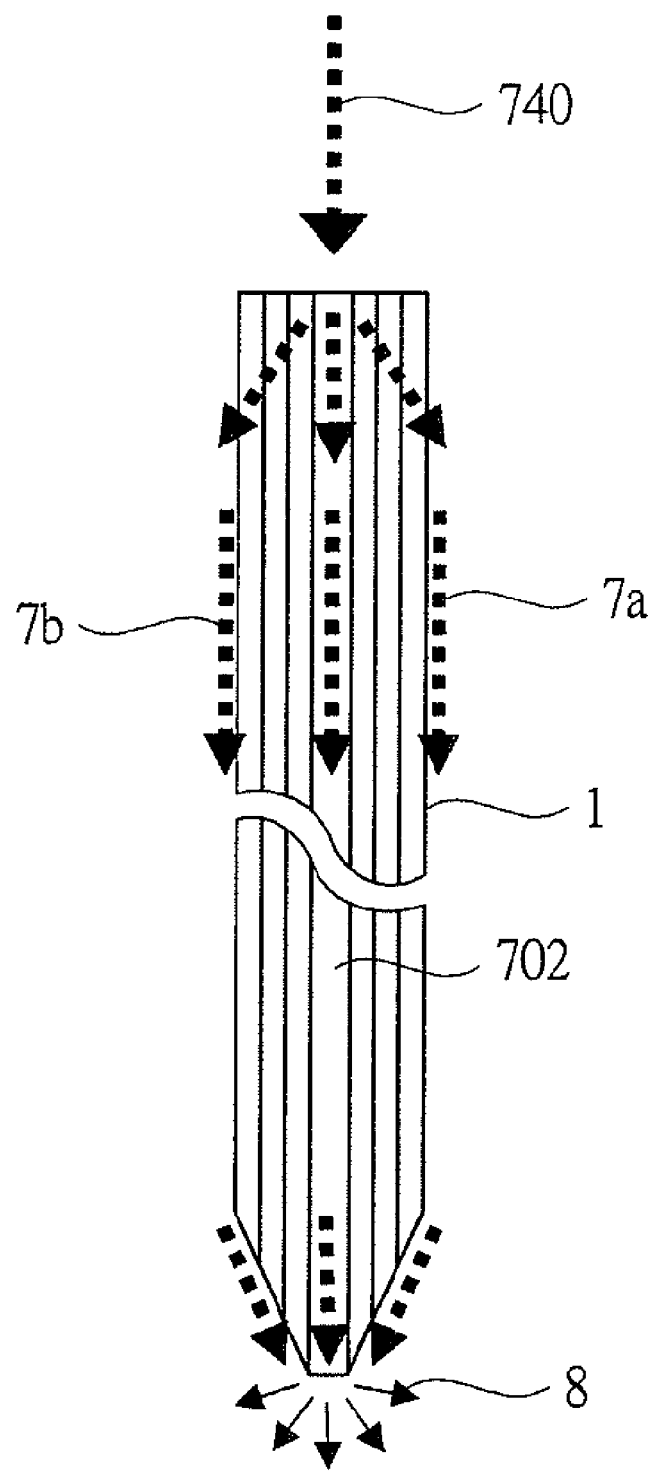
FIG. 2 is a cross-sectional view of a front surface of another plasmon-enhanced near-field probe according to the first embodiment of the present invention.

The configuration of the plasmon-enhanced near-field probe is not limited to the one illustrated in FIG. 1, and can also be the one as illustrated in FIG. 2. That is, a gold nano-rod 702 is filled inside the nanotube 1 in place of the gold nano-particles 2 (2a, 2c, and 2b), and the surface plasmon 740 is guided toward the top end portion in the nanotube 1, so that the minute near-field light spot 8 can be generated by the above-described same principle. In place of the gold nano-rod 702, a silver nano-rod can be also used. And, in stead of totally filling, a plurality of nano-rods can be arranged in a formation of bead so that each one is away from the other at a distance of nanometers to sub-nanometers.

Figure 3:
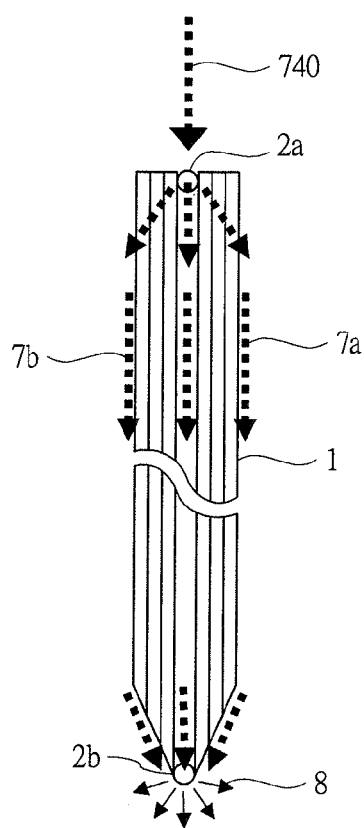
FIG. 3 is a cross-sectional view of a front surface of still another plasmon-enhanced near-field probe according to the first embodiment of the present invention.

Further, a configuration as illustrated in FIG. 3 is possible. That is, as illustrated in FIG. 1, instead of totally filling the gold nano-particles 2, the gold nano-particles 2a and 2b are filled in only the top and bottom end portions in the nanotube 1, and the surface plasmon 740 is guided toward the top end portion in the nanotube 1, so that the minute near-field light spot 8 can be generated by the above-described same principle. Also in this case, even if silver nano-particles are used in place of the gold nano-particles 2, similar effects can be obtained.

Figure 4:
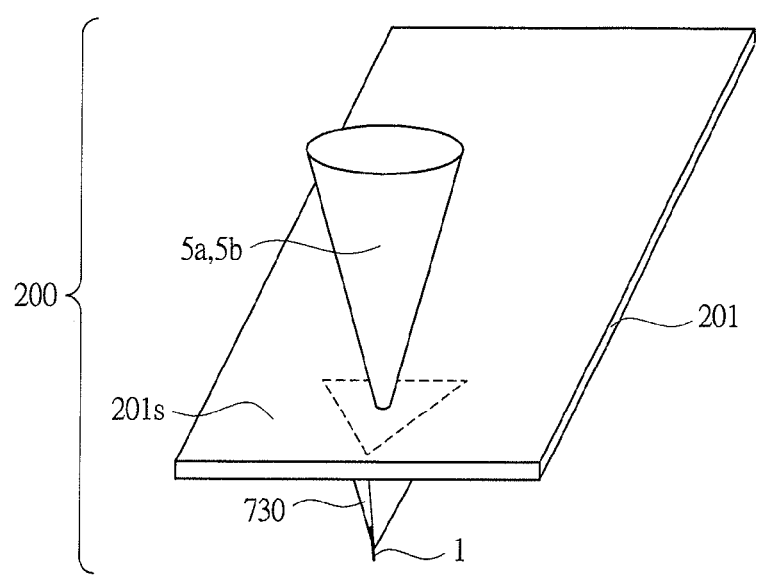
FIG. 4 is a perspective view of a plasmon exciting unit according to the first embodiment of the present invention.

Next, a configuration of the plasmon exciting unit exciting the surface plasmon 740 at the top end portion in the nanotube 1 is described with reference to FIGS. 4 and 5. FIG. 4 illustrates an entire configuration of a plasmon exciting unit 200. At a tip of a cantilever 201 made of, for example, Si, a chip 730 having a triangular pyramid shape also made of Si is formed, and the nanotube 1 is fixed at a tip of the chip 730. Onto a rear surface 201s of the cantilever 201, excitation lights 5a and 5b which are far-field lights are focused and irradiated.

The above-described state is described in detail with reference to a cross-sectional view from sides of the cantilever 201 and the chip 730 illustrated in FIG. 5A. When the cantilever 201 and the chip 730 are made of Si, the excitation lights 5a and 5b with using, for example, near-infrared laser light having a wavelength of 886 nm are focused by a lens with a Numerical Aperture (NA) of 0.2, and irradiated onto the rear surface 201s of the cantilever 201. A polarization direction 5p is of P polarization, and a collection (focus) angle 735 is about 23 degrees. An incident angle 736 is desirably close to 75 degrees of a Brewster's angle for suppressing loss in light quantity due to surface reflection. The incident excitation light is refracted to be focused to a ridgeline 730w of the triangular-pyramid-shaped chip 730. A collection angle 737 is about 6 degrees. An incident angle 738 with respect to the ridgeline 730w is desirably set to about 16 degrees of a critical angle or larger. Gold thin films 730f and 730r are coated on a surface of the chip 730.

Figure 5A:
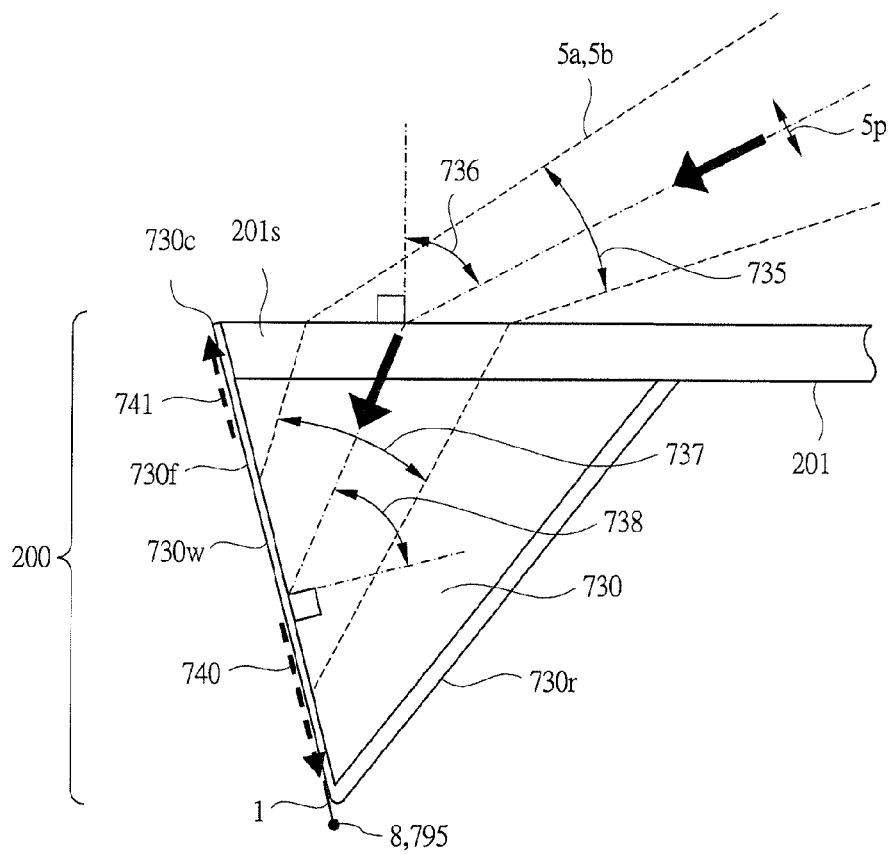
FIG. 5A is a cross-sectional view of a side surface of the plasmon exciting unit according to the first embodiment of the present invention.
Figure 5B:
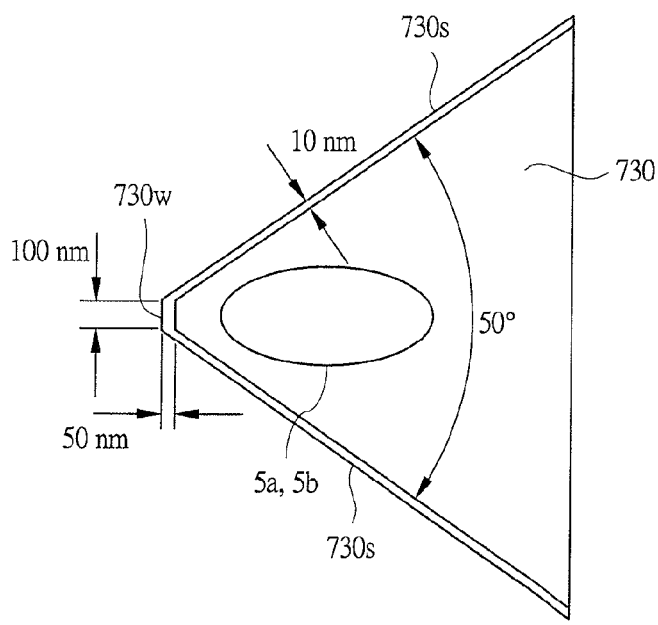
FIG. 5B is a cross-sectional view of the plasmon exciting unit according to the first embodiment of the present invention viewed from a rear surface of a cantilever.

FIG. 5B is a cross-sectional view of the chip 730 viewed from the rear surface of the cantilever 201. It is desired that an angle formed by two slopes sandwiching the ridgeline 730w is 50 degrees, a film thickness of the gold thin film 730f along the ridgeline 730w is about 50 nm, and a film thickness of the gold thin film 730s on the two slopes sandwiching the ridgeline 730w is about 10 nm thinner than that of the gold thin film 730f with taking efficiency of plasmon generation into consideration. A width of the ridgeline 730w is set to 100 nm in the present embodiment. As illustrated in FIG. 5A, by the irradiation of the excitation light of P polarization to the ridgeline 730w, Transverse Magnetic (TM) mode plasmon (also referred to as surface plasmon) 740 is excited along the surface of the gold thin film 730f, and propagates toward the nanotube 1 fixed at the tip of the chip 730. An allowable range of the incident angle 738 of resonance dip exciting plasmon is within only 2 to 3 degrees, and therefore, a range of the collection angle 737 of the excitation light is desirably about 6 degrees which is double the allowable range.

Figure 6:
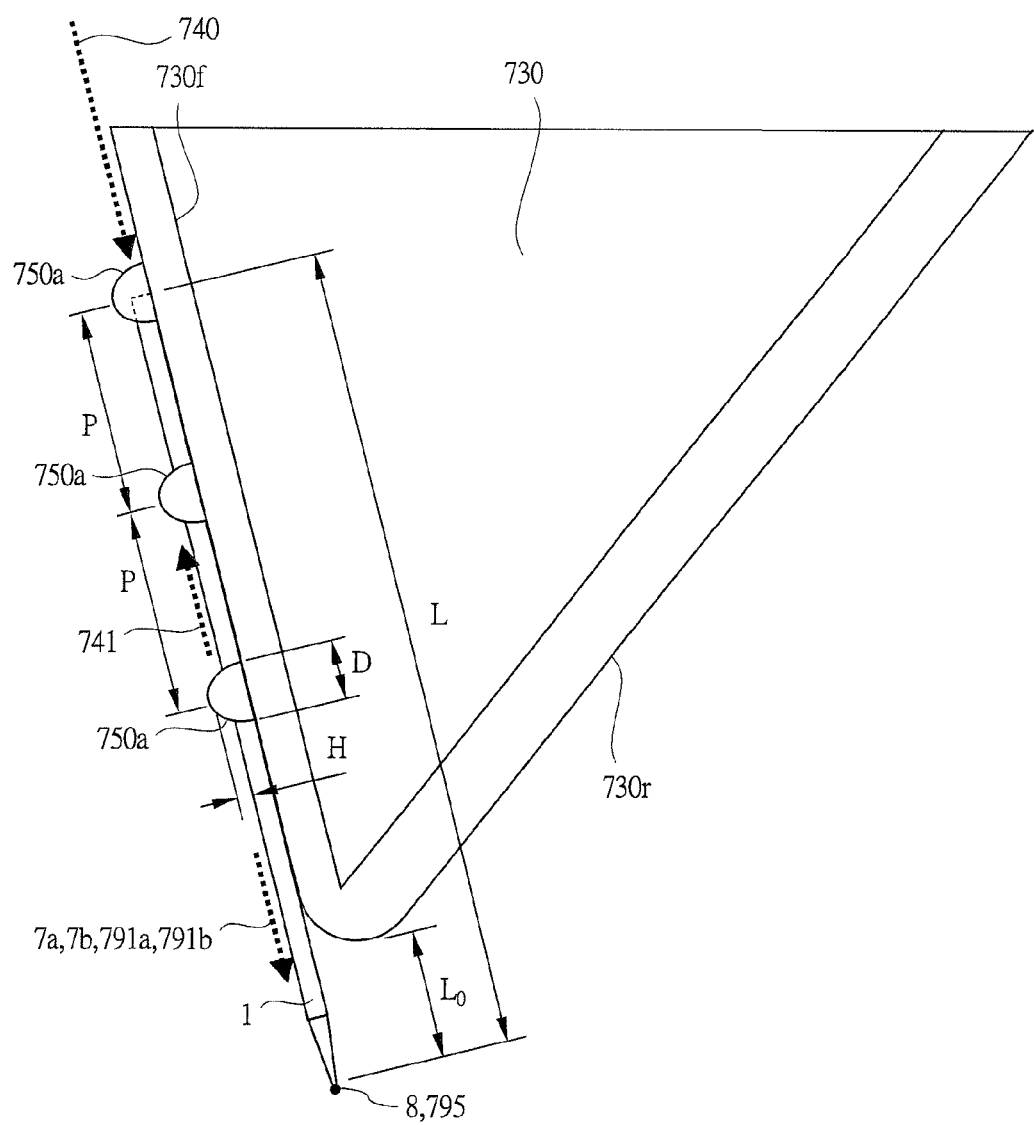
FIG. 6 is a cross-sectional view illustrating a method of fixing a nanotube to a chip and a principle of guiding an excited TM (transverse magnetic) mode plasmon to the nanotube in the plasmon exciting unit according to the first embodiment of the present invention.

Next, a method of fixing the nanotube 1 to the chip 730 and a principle of guiding the excited TM mode plasmon 740 toward the nanotube 1 in the plasmon exciting unit 200 are described with reference to FIG. 6. As illustrated in FIG. 6, three gold dots 750a are formed by irradiating electron beams, and these gold dots 750a are used as a binder to be melted to adhere the nanotube 1 on the tip of the chip 730. Here, the gold dots at an incident end portion in the nanotube 1 are not only for fixing the nanotube 1 to the chip 730 but also for playing a role of a light-harvesting antenna for the TM mode plasmon 740, and a maximum coupling efficiency can be obtained by adjusting a diameter D and a height H of each gold dot. For example, with taking a coupling efficiency of plasmon to a nanotube having a diameter of 20 nm into consideration, the diameter D and the height H of each of the gold dots 750a are desirably almost the same with the diameter of 20 nm of the nanotube 1. In the present embodiment, in order to ensure sufficient strength for fixing the nanotube 1 and also obtain a coupling efficiency as high as possible, it is set such that D=40 nm, H=40 nm, which are almost double the diameter of the nanotube 1, and a distance between the gold dots P=250 nm.

In this manner, the TM mode plasmon 740 is efficiently coupled with the gold nano-particles 2a at the incident end portion in the nanotube 1 or the top end portion of the gold nano-rod 702 in the nanotube 1 illustrated in FIGS. 1 to 3, and further, the plasmon propagates from the top end portion to the bottom end portion through the gold nano-particles 2c and 2b filled in the surface side and the inside of the nanotube 1 or the gold nano-rod 702 in the nanotube 1 as illustrated by dashed arrows 7a and 7b, and finally, the near-field light 8 is outputted from the bottom end portion in the nanotube 1.

Note that, in FIG. 6, a portion of the TM mode plasmon 740 not coupled with the nanotube 1 becomes near-field light at the tip of the chip 730, and the near-field light becomes background noises against the near-field light 8 generated at the tip portion of the nanotube 1. To avoid influences of the background noises, a distance $L_0$ between the tips of the chip 730 and the nanotube 1 is desirably a dimension of the tip portion of the chip or larger, for example, several ten to several hundred nm or larger.

Although the cantilever 201 and the chip 730 are made of Si in the present embodiment, they are not limited to the material in the present invention, and the cantilever 201 and the chip 730 made of, for example, $Si_3N_4$ can be also applicable. In this case, for example, visible light having a wavelength of 532 nm can be used as the excitation light. Visible laser lights having a wavelength 532 nm are focused by a lens with a NA (Numerical Aperture) of 0.1 to be irradiated onto the rear surface 201s of the cantilever 201. The polarization direction 5p is of P polarization, and the collection angle 735 is about 11.5 degrees. The incident angle 736 is desirably close to 63 degrees which is a Brewster's angle for suppressing loss in light quantity due to surface reflection. The incident excitation lights are refracted to be focused to the ridgeline 730w of the triangular-pyramid-shaped chip 730. The collection angle 737 becomes about 5.7 degrees. The incident angle 738 with respect to the ridgeline 730w is desirably set about 30 degrees of a critical angle or larger.

In the probe, the plasmon from the top end portion toward the bottom end portion in the nanotube 1 interferes with plasmon reflected in a reverse direction to the plasmon to cause a standing wave, and nodes (weak-amplitude portions) and anti-nodes strong-amplitude portions) are generated. Positions of the node and the anti-node depend on wavelengths of the excitation lights 5a and 5b. Therefore, a length L of the nanotube 1 is desirably adjusted so that the anti-node of the standing wave matches the bottom end portion in the nanotube 1 in accordance with a wavelength of the laser light.

Figure 7:
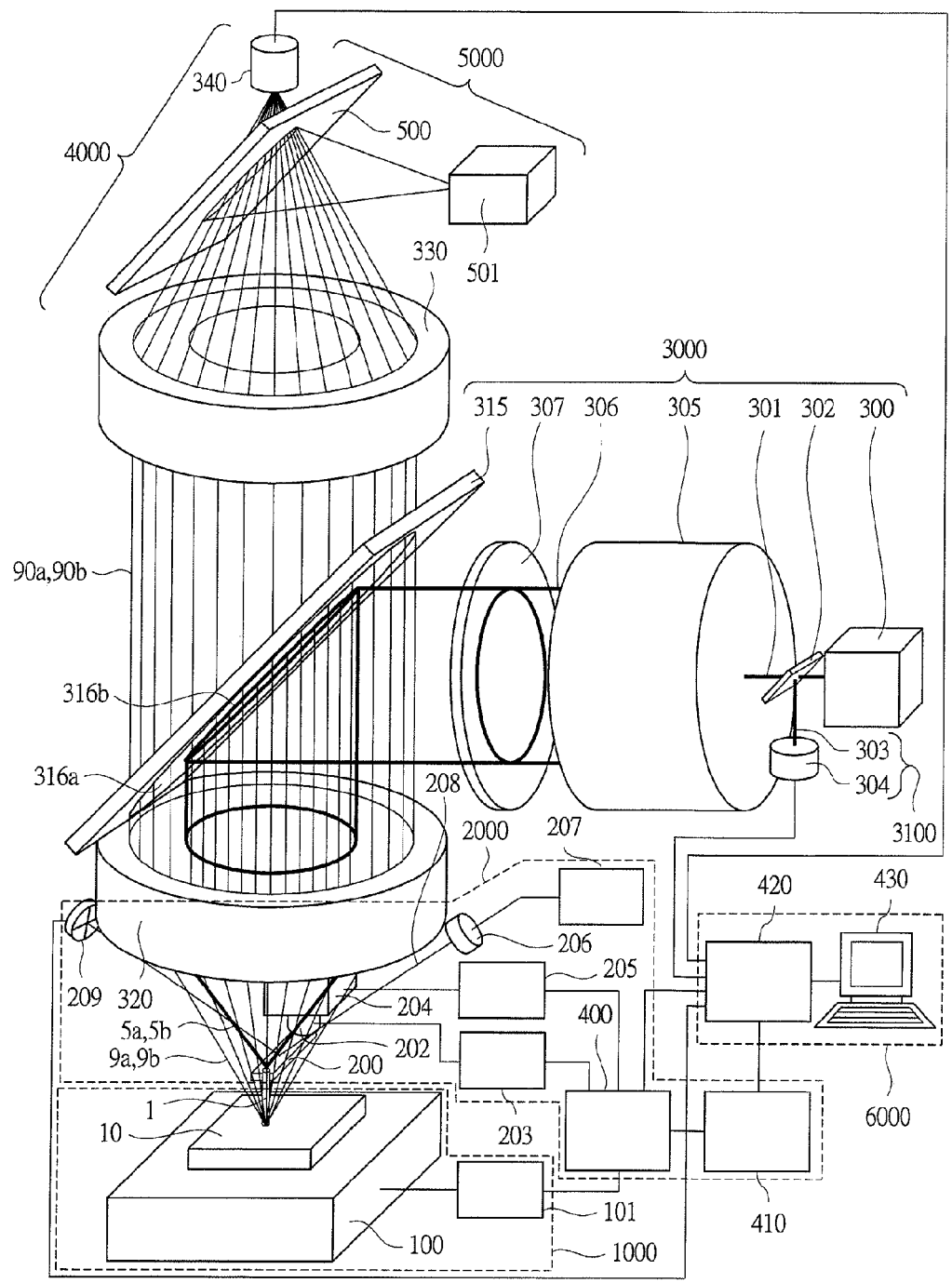
FIG. 7 is a block diagram illustrating a schematic configuration of a scanning probe microscope according to the first embodiment of the present invention.

FIG. 7 illustrates a configuration of the scanning probe microscope installing the probe and the plasmon exciting unit 200. The scanning probe microscope includes: a stage unit 1000 movable in three-dimensional direction of XYZ with a sample placed on itself; a measuring unit 2000 driving the nanotube 1 to measure the sample and processing an obtained signal to generate an image; an illumination optical system 3000 irradiating light for generating near-field light between the tip of the nanotube 1 and the sample; a detection optical system 4000 focusing light converted from the near-field light to far-field light and detecting the light; a sample monitoring optical system 5000 for observing a measured portion on the sample and positioning the portion; and a control unit 6000 controlling the entire units and systems.

The stage unit 1000 includes a XYZ stage 100 movable in three-dimensional direction of XYZ with a sample placed on itself, and a driver 101. A sample 10 is placed on the XYZ stage 100, and the XYZ stage 100 is driven by the driver 101 to be positioned at a desired measuring position as observing a surface of the sample 10 by the sample monitoring optical system 5000 through the detection optical system 4000.

The measuring unit 2000 includes: a plasmon exciting unit 200 collecting laser light (wavelength of 886 nm) onto the rear surface of the cantilever 201 to excite and propagate plasmon to the nanotube 1; a piezoelectric element actuator 202; a XYZ piezoelectric element actuator 204; a semiconductor laser 206 irradiating laser light (wavelength of 405 nm) 208 onto the rear surface of the cantilever 201; a four-split position sensor 209 detecting reflection light from the cantilever 201; and a driving circuit 207 controlling the semiconductor laser 206.

The sample monitoring optical system 5000 includes: a mirror 500 insertable into an optical path of the detection optical system 4000 by driving means not illustrated; and an imaging camera 501 taking an image of light transmitting through an image-forming lens 330 and reflected by the mirror 500. When the XYZ stage 100 with the sample 10 placed on itself is driven by the driver 101 to set the desired measuring position of the sample 10 under the nanotube 1, the mirror 500 is driven by the driving means not illustrated to be inserted in the optical path of the detection optical system 4000, and the optical path of the reflection light from the sample 10 is bent in a direction of the imaging camera 501, and then, an optical image of the surface of the sample is observed by the imaging camera 501. When the desired measuring position of the sample 10 is positioned under the probe (nanotube 1), the mirror 500 is driven by the driving means not illustrated to be retracted from the optical path of the detection optical system 4000.

As illustrated in FIGS. 4, 5A, and 6, the nanotube 1 is fixed at the tip of the triangular-pyramid-shaped chip 730 made of Si formed at the tip of the cantilever 201 made of Si. This cantilever 201 is fixed at the piezoelectric element actuator 202 for microvibration in the Z direction, and further at the XYZ piezoelectric element actuator 204 for fine scanning in XYZ directions.

The illumination optical system 3000 includes: a semiconductor laser 300 having a wavelength of 886 nm; a beam monitor optical system 3100; a beam shaping optical system 305; a polarizing plate 307; a beam splitter 315; and an objective lens 320. In this configuration, light 301 emitted from the semiconductor laser 300 and transmitting through the beam splitter 302 of the beam monitor optical system 3100 is converted to collimated light 306 having a circular beam shape by the beam shaping optical system 305, and further, transmits through the polarizing plate 307 to enter the beam splitter 315, is reflected by a circular reflecting region 316b, and is irradiated onto the rear surface of the cantilever 201 of the plasmon exciting unit 200 as P-polarized focused light (also referred to as excitation light) 5a and 5b by the objective lens 320, so that the TM mode plasmon 740 is excited at the top end portion in the nanotube 1.

In the beam monitoring optical system 3100, the light emitted from the semiconductor laser 300 is split into two by the beam splitter 302 having a ratio of transmittance:reflectance=96:4, and reflection light 303 is received by a photoelectric conversion element 340 such as a photodiode to be converted to an electrical signal. This signal is sent to an entire control unit 420 in the control unit 6000 to be used for monitoring variations in strength of the emitted light from the semiconductor laser 300. When the strength of the emitted light is varied, the output from the semiconductor laser 300 is controlled, so that the strength becomes constant.

In the measuring unit 2000, as described above, the TM mode plasmon 740 excited in the plasmon exciting unit 200 propagates toward the gold nano-particles 2a at the incident end portion in the nanotube 1 or the top end portion of the gold nano-rod 702 in the nanotube 1 illustrated in FIGS. 1 to 3, and further propagates from the top end portion to the bottom end portion through the gold nano-particles 2c and 2b filled in the surface side and the inside of the nanotube 1 or the gold nano-rod 702 in the nanotube 1 as illustrated by dashed arrows 7a and 7b. Since the bottom end portion in the nanotube 1 is sharpened as a circular cone shape, the electric field intensity is locally enhanced, so that strong localized plasmon is excited on the gold nano-particles 2b at the bottom end portion in the nanotube 1 or the bottom end portion of the gold nano-rod 702 in the nanotube 1. This localized plasmon interacts with the surface structure of the sample 10 to cause a strong resonant phenomenon, so that the minute near-field light spot 8 is generated. The reflection light from the near-field light 8 interacting with the surface structure of the sample 10 is converted to far-field lights 9a and 9b.

The detection optical system 4000 detecting the far-field lights 9a and 9b reflected from the sample 10 includes: the objective lens 320; the beam splitter 315; the image-forming lens 330; and the photoelectric conversion element 340.

In this detection optical system 4000, the far-field lights 9a and 9b are collected by the objective lens 320 to be the collimated light, and then, are transmitted through an zone-transmitting region 316a of the beam splitter 315, and the transmitted lights 90a and 90b are collected by the image-forming lens 330 onto a light-receiving surface of the photoelectric conversion element 340 such as a photodiode or a photomultiplier tube for photoelectric conversion.

In an image forming unit 410 of the measuring unit 2000, a detection signal from the photoelectric conversion element 340 is processed by using control signals from a scanning control unit 400 generating a control signal from the driver 203 driving the piezoelectric element actuator 202 and a control signal from the driver 205 driving the XYZ piezoelectric element actuator 204 to generate a two-dimensional near-field optical image. Also, an output from the four-split position sensor 209 is processed by using control signals from the drivers 203 and 205 that drives the piezoelectric element actuator 202 and the XYZ piezoelectric element actuator 204 to generate an AFM image.

The two-dimensional near-field optical image and the AFM image generated by the image forming unit 410 are sent to the entire control unit 420 in the control unit 6000, and each images is displayed on different output screens or a same output screen in an output unit 430 such as a display.

Here, how to obtain a contact force by using an optical lever principle when the nanotube 1 which is a probe fixed at the tip portion of the cantilever 201 contacts with the sample 10 is described. The laser light (wavelength of 405 nm) from the semiconductor laser 206 driven by the driving circuit 207 is irradiated onto the rear surface of the cantilever 201, and its reflection light is received by the four-split position sensor 209. The XYZ piezoelectric element actuator 204 is driven by the driver 205 to lower the cantilever 201, so that the nanotube 1 fixed at the tip portion of the chip 730 is contacted with the sample 10. In this state, when the cantilever 201 is further lowered, a tilt of the cantilever 201 is changed to change the reflected direction of the laser irradiated onto the rear surface of the cantilever 201, change the incident position of the laser light on the four-split position sensor 209, and change the output signal from the four-split position sensor 209. This changed signal is compared with a contact force data based on a relation between the previously-obtained output signal from the four-split position sensor 209 and the tilt of the cantilever 201, so that the contact force can be obtained.

Figure 8:
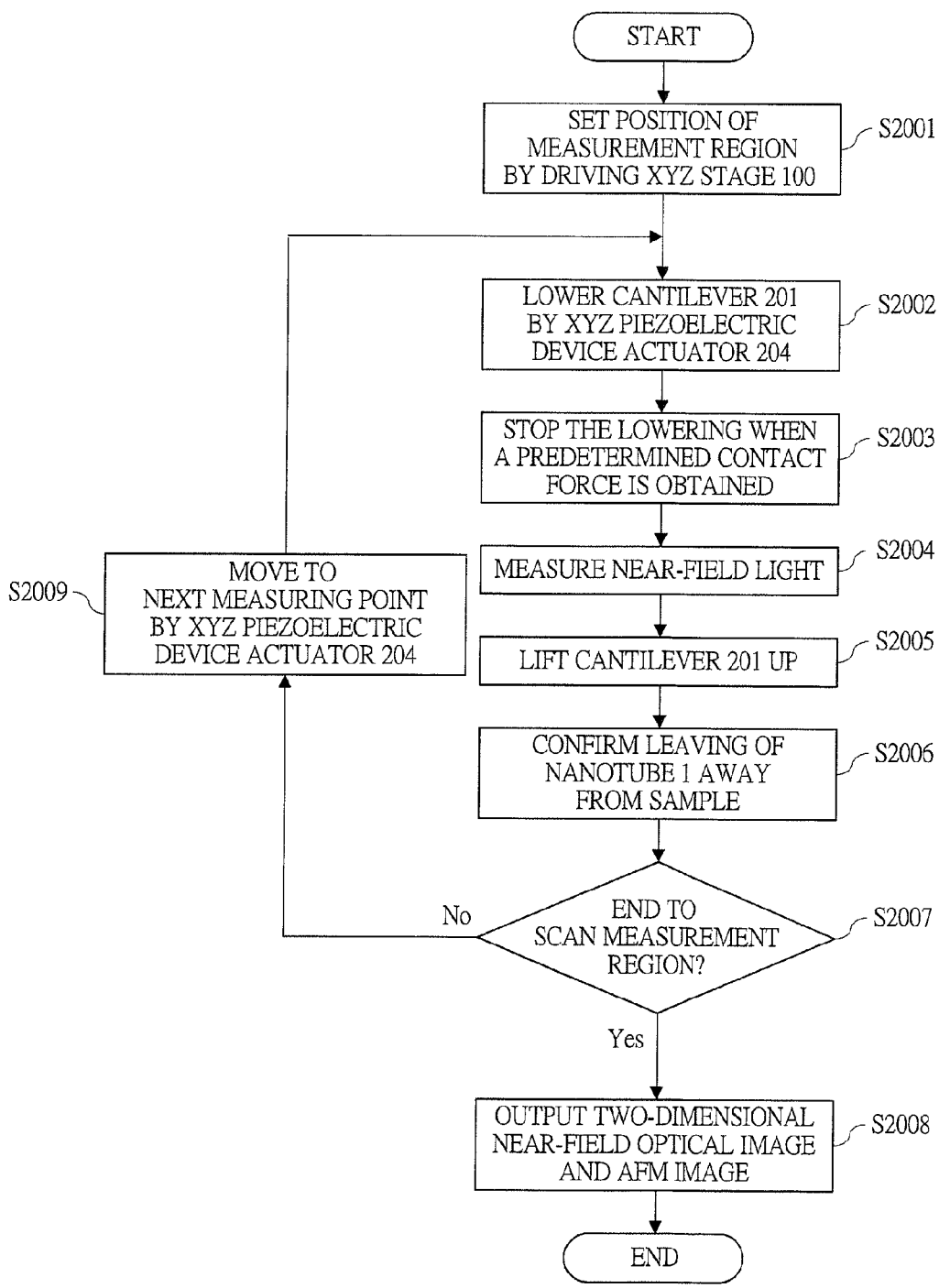
FIG. 8 is a flow chart illustrating a procedure of measuring a surface of a sample according to the first embodiment of the present invention.
Figure 9:
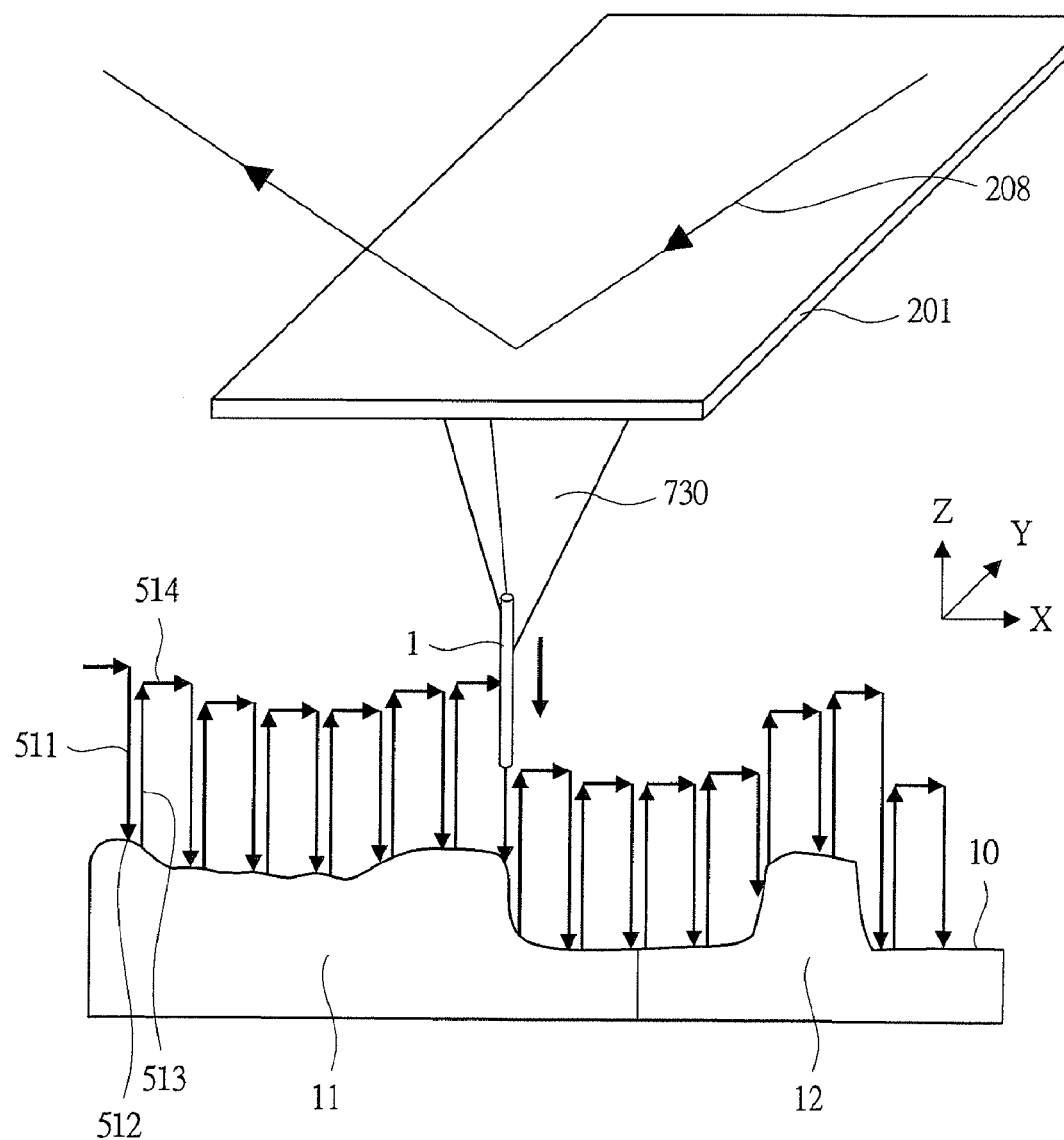
FIG. 9 is a cross-sectional view of the sample and a perspective view of the cantilever illustrating step-in scanning of the nanotube according to the first embodiment of the present invention.

Next, the procedure of measuring the surface of the sample is described with reference to FIG. 8. First, the XYZ stage 100 is driven so that the measurement region of the sample 10 is positioned below the nanotube 1 fixed at the tip portion of the chip 730 of the cantilever 201 (S2001). Next, as illustrated in FIG. 9, in the measurement region of the sample 10, as monitoring a state (contact force) of the contact between the nanotube 1 and the sample surface by the output signal from the four-split position sensor 209, the cantilever 201 is lowered by the XYZ piezoelectric element actuator 204 (Z-direction scanning 511) (S2002), and the lowering is stopped at a time of a predetermined contact force (S2003).

After the near-field light is measured at a lowering point 512 (S2004), the cantilever 201 is lifted up (Z-direction scanning 513) (S2005). Then, when it is detected that the nanotube 1 is completely away from the sample 10 based on the output signal from the four-split position sensor 209 (S2006), it is determined whether measurement of the measurement region ends or not (S2007), and if it does not end yet (No), the XYZ piezoelectric element actuator 204 is driven to move the cantilever 201 to the next measuring point (X scanning 514) (S2009). A moving distance (feeding pitch) in the X scanning is determined in accordance with the resolution required for the observation. At the next measuring point, the cantilever 201 is lowered again to measure the near-field light (S2002 to S2006).

The above step-in operation is repeatedly performed over a two-dimensional measurement region (XY region) by using the XYZ piezoelectric element actuator 204, and then, the measurement is completed (S2007). Here, a method of measuring the two-dimensional measurement region is performed by scanning similar to raster scan in a television. A feeding pitch (distance between adjacent scannings) in the Y direction at this time is determined in accordance with the resolution required for the observation.

The XYZ-direction scanning of the XYZ piezoelectric element actuator 204 driven by the driver 205, the vibration control of the piezoelectric element actuator 202 driven by the driver 203, and the positioning of the sample 10 by the XYZ stage 100 are overall controlled by the scanning control unit 400 in the measuring unit 2000. Also, all of the control of the contact force between the nanotube 1 and the sample 10 and the measurement of the near-field light are overall controlled by the entire control unit 420 in the control unit 6000. Each of XYZ scanning signals of the XYZ piezoelectric element actuator 204 from the scanning control unit 400 and signals of the near-field light measurements from the entire control unit 420 is sent to the image forming unit 410, the two-dimensional near-field optical image and the AFM image are generated, and the images are outputted to the output unit 430 such as a display via the entire control unit 420 (S2008).

Figure 10A:
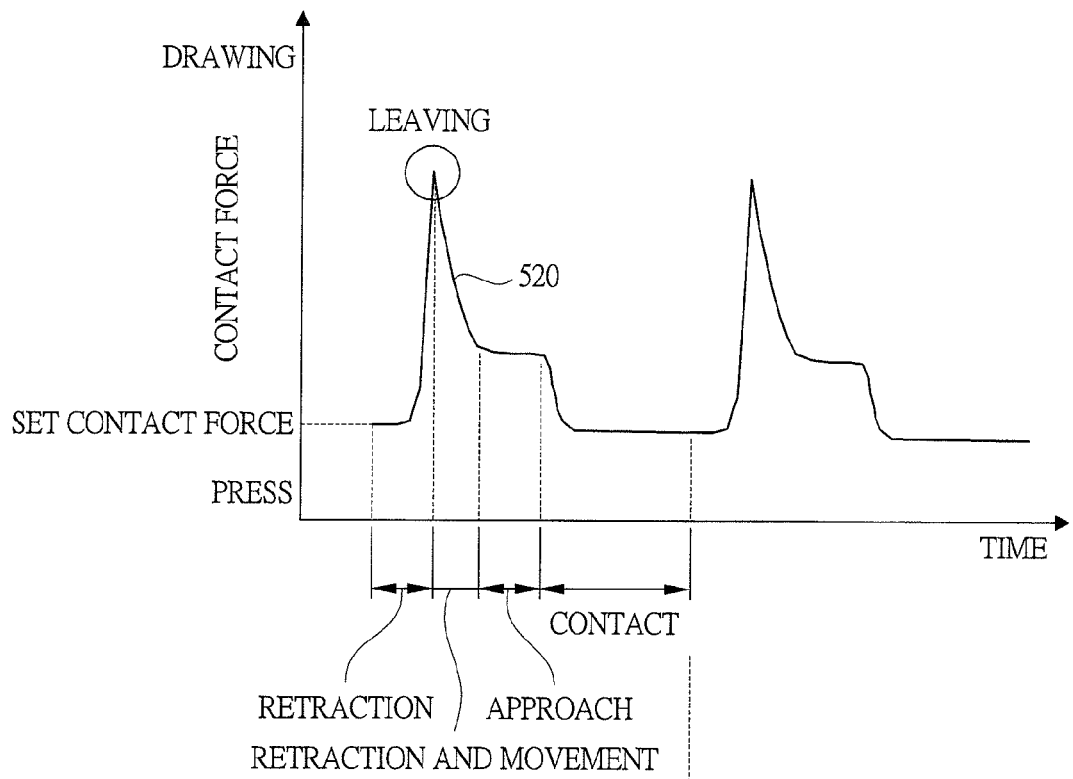
FIG. 10A is a graph illustrating a relation of a measurement timing of near-field light with respect to a contact force between the nanotube and the sample according to the first embodiment of the present invention.
Figure 10B:
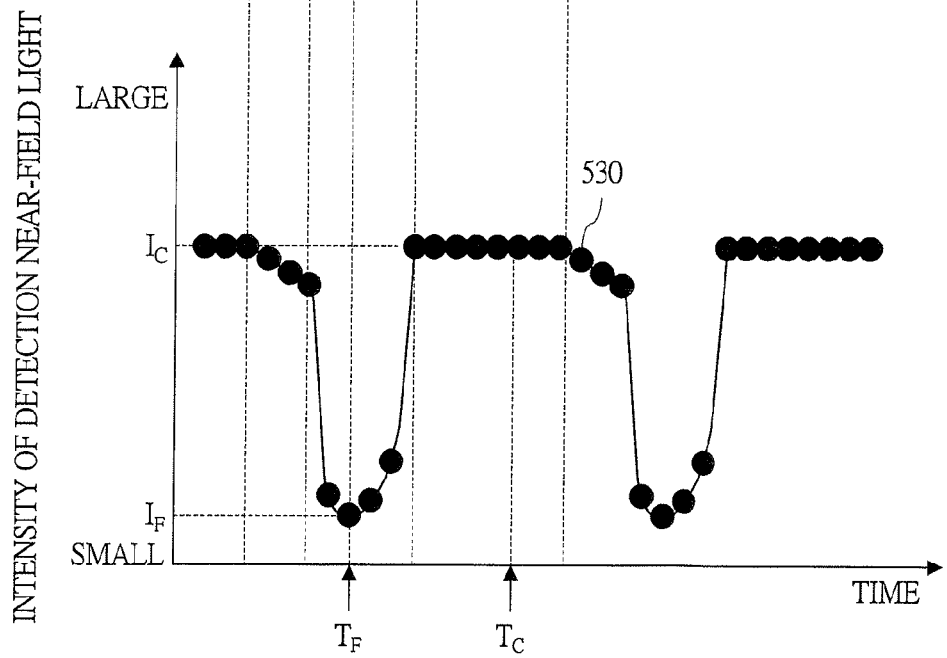
FIG. 10B is a graph illustrating a relation of a measurement timing of near-field light with respect to an intensity of detected near-field light according to the first embodiment of the present invention.

FIGS. 10A and 10B illustrate a relation of the measuring timing of the near-field light and the contact force between the nanotube and the sample. As illustrated by a contact-force changing curve 520 in FIG. 10A, the contact force is changed from a pressing direction to a drawing direction as the nanotube 1 is lifted up to be retracted from the sample 10, and the contact force becomes maximum at a moment of leaving the sample 10. After the leaving, during a movement to the next measuring point and an approach to the sample 10 again, the nanotube does not receive the contact force at all. The nanotube 1 starts approaching again, a force in the pressing direction is added at a moment of contacting with the sample 10, and the lowering of the cantilever 201 is stopped at a moment of reaching a set contact force.

Meanwhile, as illustrated by a detection-light intensity curve 530 in FIG. 10B, the intensity of the detected near-field light is gradually decreased as the nanotube 1 is lifted up to be retracted from the sample 10, and after leaving from the sample 10, the intensity becomes a minimum value $I_F$ at a moment $T_F$ of changing from the retracting operation to the approaching operation. And then, the nanotube 1 starts approaching again, the intensity of the detected near-field light becomes a maximum value $I_C$ at a moment when the gold nano-particles 2b or the bottom end portion of the gold nano-rod 702 contacts with the sample 10, and this intensity $I_C$ is maintained during a maintaining of the set contact force. A difference $\Delta I = I_C - I_F$ obtained from the maximum value $I_C$ and the minimum value $I_F$ at an arbitrary time $T_C$ is stored in the entire control unit 420 as a reflection-light intensity at a measuring point. By repeatedly performing the above-described operation over the two-dimensional measurement region, the reflectivity distribution of the sample surface in the two-dimensional region can be measured with an optical resolution almost equal to 4 nm which is a diameter of the gold nano-particle or the gold nano-rod. The set contact force is desirably executed by 1 nN or smaller, more preferably, pN to sub-nN.

Note that, in the present embodiment, the microvibration of the cantilever 201 in the Z direction is not performed, and only the lowering for the set contact force and lifting-up operations are performed. However, the detection of the contact force is not limited to the optical-lever method described above, and the contact force can be detected from a change in oscillation amplitude or vibrational frequency by performing the microvibration in the Z direction of the cantilever by the piezoelectric element actuator 202 with an amplitude on a sub-nanometer order and a frequency on a MHz order.

Note that, it is preferable that the wavelengths of the excitation lights 5a and 5b are not fixed to 886 nm but finely adjusted to such a wavelength that the excited TM mode plasmon 740 propagates toward the nanotube 1 without loss, that is, with high coupling efficiency. For example, it is preferable that white-light laser is used and an optimum coupling wavelength is selected for the excitation light, or white laser light is used as the excitation light and only an optimum coupling wavelength is selectively detected by a wavelength selective filter installed in front of the photoelectric conversion element 340.

As illustrated in FIGS. 1 to 3 and 10, according to the present embodiment, as well as the AFM image and the near-field optical image can be simultaneously obtained, the near-field light 8 having a spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 in the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved.

[First Modification Example of the Detection Optical System 4000]

Figure 11:
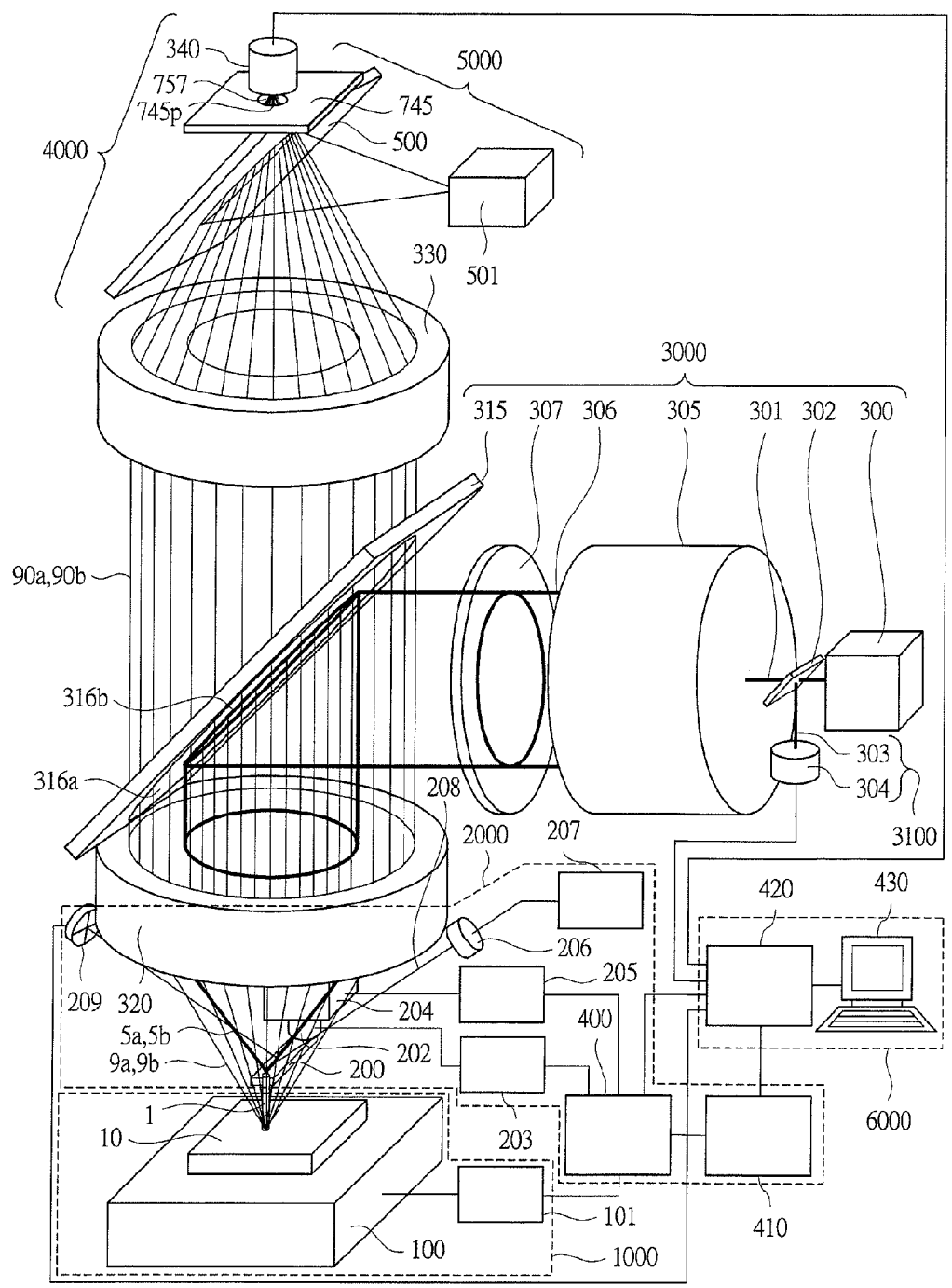
FIG. 11 is a block diagram illustrating a schematic configuration of a scanning probe microscope in a first modification example of a detection optical system according to the first embodiment of the present invention.

A first modification example of the detection optical system 4000 according to the present embodiment is described with reference to FIG. 11. FIG. 11 illustrates a configuration of a scanning probe microscope in the present modification example. In this scanning probe microscope, other configurations and functions than those of the detection optical system 4000 are the same with those of the embodiment illustrated in FIG. 7 described above, and therefore, their descriptions are omitted here.

In FIG. 6 described above, since the TM mode plasmon 740 not coupled with the nanotube 1 becomes the near-field light at the tip of the chip 730 and this becomes the background noise against the near-field light 8 generated at the tip portion of the nanotube 1, the distance $L_0$ between the tips of the chip 730 and the nanotube 1 is desirably set to the dimension of the tip portion of the chip or larger, for example, several-ten to several-hundred nm or larger. If this distance is not enough to suppress the background noise, as illustrated in FIG. 11, a light-shielding plate 745 with a pinhole 745p is installed at a conjugated position (image-forming position) with the tip of the nanotube 1 in front of the photoelectric conversion element 340, so that only the far-field light 757 converted from the near-field light 8 at the tip of the nanotube 1 can be selectively passed and the far-field light converted from the near-field light at the tip of the chip 730 can be blocked.

As illustrated in FIGS. 1 to 3 and 10 described above, according to the present modification example, as well as the AFM image and the near-field optical image can be simultaneously obtained, the near-field light 8 having the spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 at the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved. Also, since the background light from the tip of the chip 730 can be suppressed, a near-field optical image with a high S/N ratio can be obtained.

[First Modification Examples of the Measuring Unit 2000 and the Detection Optical System 4000]

Figure 12:
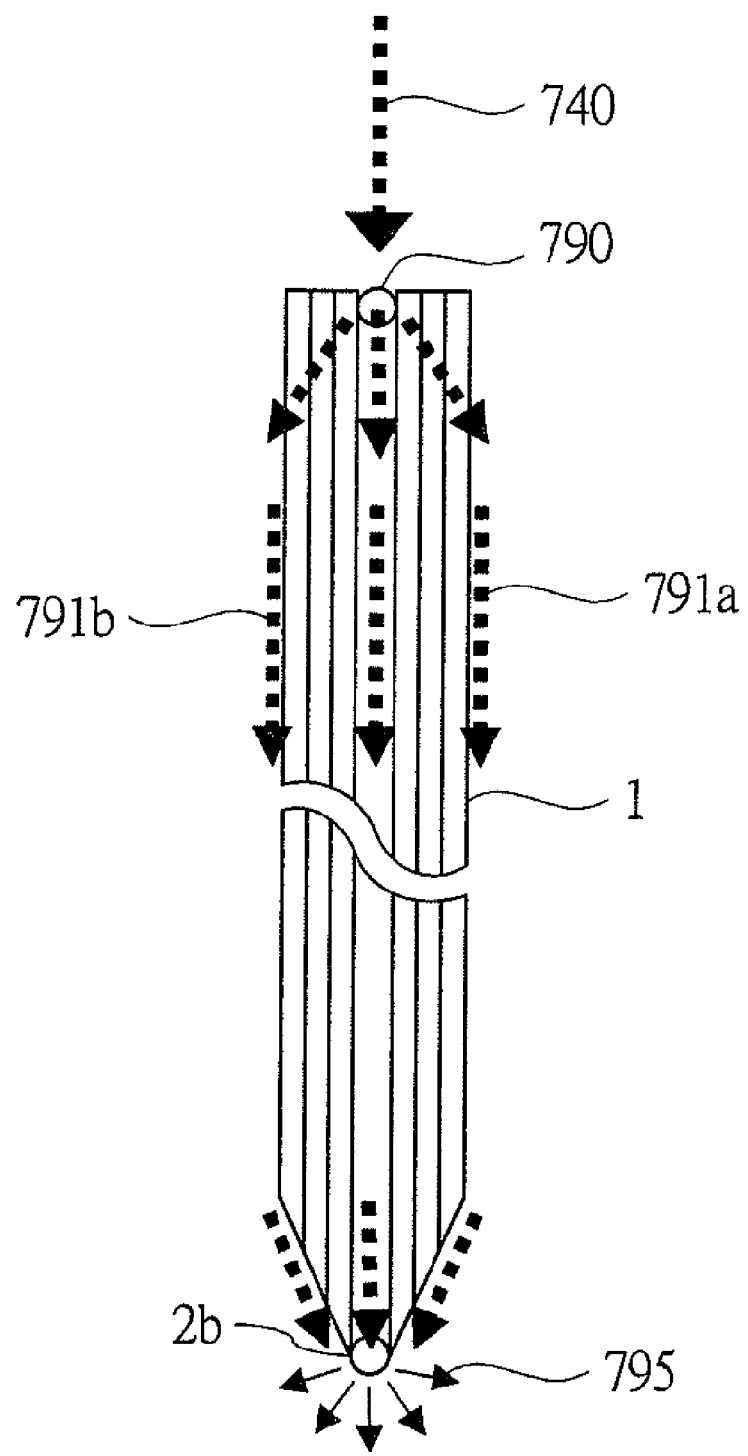
FIG. 12 is cross-sectional views of front surfaces of a measuring unit according to the first embodiment of the present invention and a plasmon-enhanced near-field probe in the first modification example of the detection optical system.

First modification examples of the measuring unit 2000 and the detection optical system 4000 according to the present embodiment are described with reference to FIGS. 12 and 13. FIG. 12 illustrates a configuration of a plasmon-enhanced near-field probe according to the present modification example. The nanotube 1 is a multilayered carbon nanotube, a metal nanotube, or a boron nitride (BN) nanotube having properties as an insulator, and a bottom end portion in the nanotube 1 is sharpened as a circular cone shape. Configurations and functions of the plasmon exciting unit 200 including the cantilever 201 and the chip 730 are the same with those illustrated in FIGS. 4 to 6 described above.

In the present modification example, as illustrated in FIG. 12, not the gold nano-particles but fluorescent particles 790 are filled into the top end portion in the nanotube 1, the fluorescent particles 790 such as a metal carbide made of V, Y, Ta, Sb, or others having photoluminescence or electroluminescence characteristics, a ZnS fluorescent material, a CaS fluorescent material, and CdSe(core)/ZnS(shell), and the gold nano-particles 2b is filled into the bottom end portion similar to the above-described embodiment. Similarly to those illustrated in FIG. 1 or 2, the gold nano-rod or the gold nano-particles may be filled in the middle of the nanotube 1.

Figure 13:
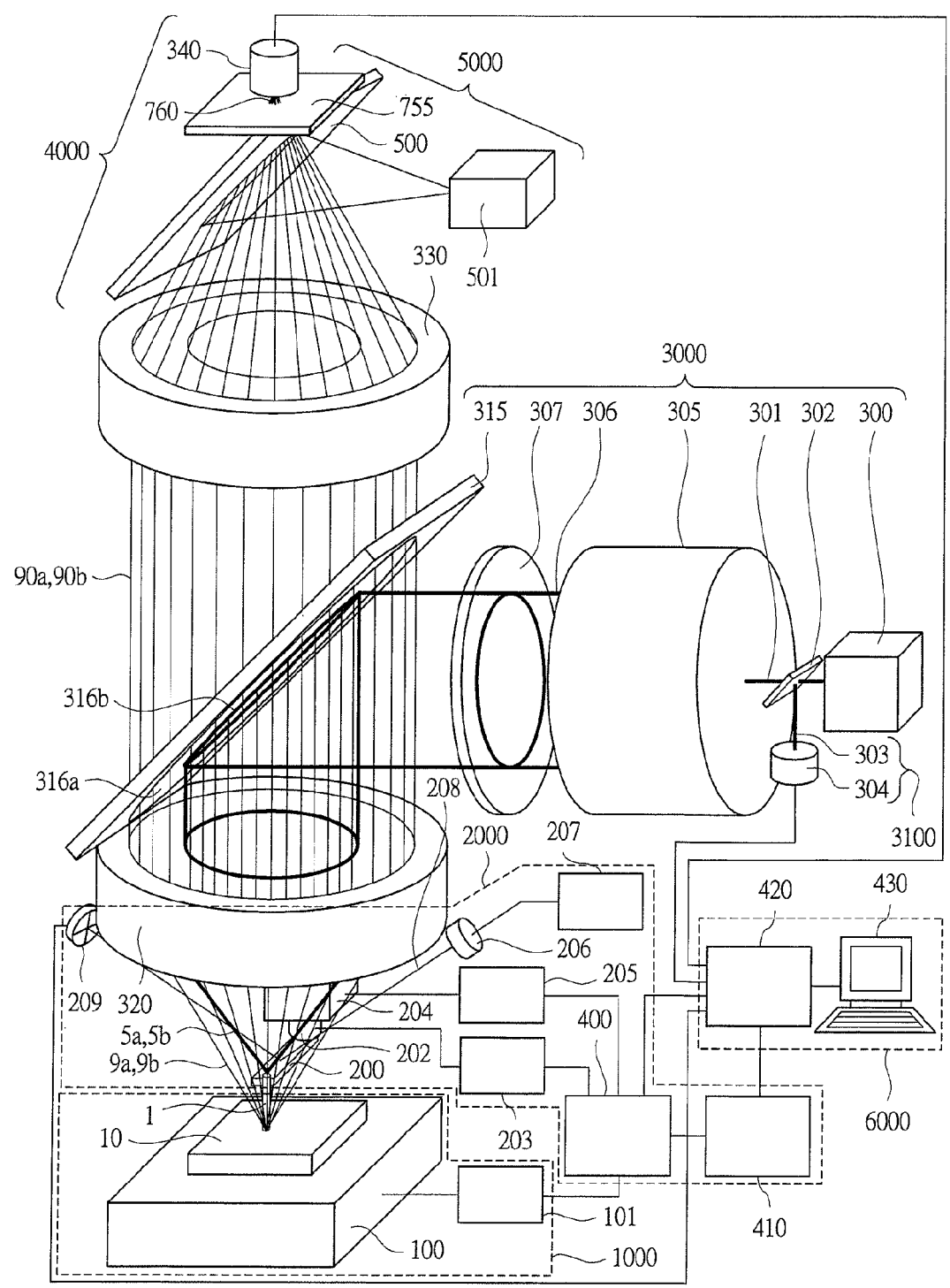
FIG. 13 is a block diagram illustrating a schematic configuration of the measuring unit according to the first embodiment of the present invention and the scanning probe microscope in the first modification example of the detection optical system.

FIG. 13 illustrates a configuration of the scanning probe microscope in which the probe is installed. Although a basic configuration and functions of the scanning probe microscope are the same with those of the scanning probe microscope according to the above-described embodiment illustrated in FIG. 7, the present modification example has a different point that a wavelength selective filter 755 is disposed in front of the photoelectric conversion element 340 such as a photodiode or a photomultiplier tube for detecting the near-field light in the detection optical system 4000, the wavelength selection filter 755 having a pass band of a fluorescent wavelength emitted by the fluorescent particles 790±10 nm.

That is, as illustrated in FIG. 5A described above, the TM mode plasmon 740 excited by the excitation lights 5a and 5b propagates toward the tip of the chip 730. This TM mode plasmon 740 excites the fluorescent particles 790 filled in the top end portion in the nanotube 1 illustrated in FIG. 12, and fluorescence having a different wavelength from those of the excitation lights 5a and 5b, so that fine spot light having the same wavelength with that of the fluorescence is induced. This fine spot light excites surface plasmon on the nanotube 1, and this surface plasmon propagates from the top end portion to the bottom end portion in the nanotube 1 as illustrated by dashed arrows 791a and 791b. Since the bottom end portion in the nanotube 1 is sharpened as a circular cone shape, the field intensity is locally enhanced, and strong localized plasmon is excited on the gold nano-particles 2b in the bottom end portion in the nanotube 1. This localized plasmon interacts with the surface structure of the sample 10 to cause a strong resonance phenomenon, so that the near-field light 795 having the same wavelength with that of the fluorescence is generated.

A spot diameter of the near-field light 795 becomes about 4 nm almost equal to that of the gold nano-particles 2b when the gold nano-particles 2b approach closest to the sample 10. That is, an optical resolution of 4 nm can be obtained by this probe. As illustrated in FIG. 13, reflection light of the near-field light 795 is collected by the objective lens 320 as far-field lights 9a and 9b to become collimated lights (transmitted lights) 90a and 90b. The collimated lights 90a and 90b transmit through the zone-transmitting region 316a of the beam splitter 315, and only a fluorescent-wavelength component 760 is extracted from the transmitted light by the wavelength selective filter 755 through the image-forming lens 330 to be photoelectrically converted by the photoelectric conversion element 340 such as a photodiode or a photomultiplier tube. The subsequent processes are the same with those of the scanning probe microscope according to the above-described embodiment illustrated in FIG. 7.

Note that, although the fluorescent particles 790 are used in the present modification example, the filled material is not limited to this, and for example, a nonlinear optical crystal and the like can be used to generate near-field light having a ½ wavelength of the incident light.

According to the present modification example, as well as the AFM image and the near-field optical image can be simultaneously obtained, the near-field light 795 having a spot diameter of 4 nm can be always stably generated between the sample 10 and the gold nano-particles 2b at the bottom end portion in the nanotube 1, and further, the near-field light 795 can be stably detected by detecting the near-field light 795 at the moment when this nanotube 1 contacts with the sample 10 with a low contact force, that is, when the gold nano-particles 2b contact with the sample 10. As a result, the resolution of the two-dimensional near-field optical image can be improved, and the image reproducibility can be dramatically improved.

Further, according to the present modification example, in FIG. 6 described above, while the near-field light generated at the tip of the chip 730 by the TM mode plasmon 740 not coupled with the nanotube 1 has the same wavelength with those of the excitation lights 5a and 5b, the near-field light 795 generated at the bottom end portion in the nanotube 1 has a different fluorescent wavelength from those of the excitation lights 5a and 5b. That is, since the near-field light generated at the tip of the chip 730 to be the background noise is wavelength-divided and only the near-field light 795 generated at the bottom end portion in the nanotube 1 can be detected, the near-field optical image with a high S/N ratio can be obtained. Similarly, it is possible to significantly reduce background noises such as scattered lights in the middle of the optical path of the laser light emitted from the semiconductor laser 300 and in the nanotube itself, and therefore, the near-field optical image with a high S/N ratio can be obtained.

[Second Modification Example of the Measuring Unit 2000 and the Detection Optical System 4000]

A second modification example of the measuring unit 2000 and the detection optical system 4000 according to the present embodiment are described with reference to FIGS. 5A and 6 described above and FIG. 14. As illustrated in FIGS. 5A and 6 described above, the TM mode plasmon 740 excited by the excitation lights 5a and 5b propagates toward the tip of the chip 730, and is coupled with the gold dots 750a at the incident end portion in the nanotube 1, the gold nano-particles 2a at the incident end portion in the nanotube 1, or the top end portion of the gold nano-rod 702 in the nanotube 1 to propagate from the top end portion toward the bottom end portion in the nanotube 1 as surface plasmon (illustrated by dashed arrows 7a and 7b), so that the near-field light 8 is outputted from the bottom end portion in the nanotube 1. Reflection light from the near-field light 8 interacting with the surface structure of the sample 10 is converted into the far-field lights 9a and 9b. In the scanning probe microscope according to the above-described embodiment illustrated in FIG. 7, the near-field optical image is obtained by detecting these far-field lights 9a and 9b.

Figure 14:
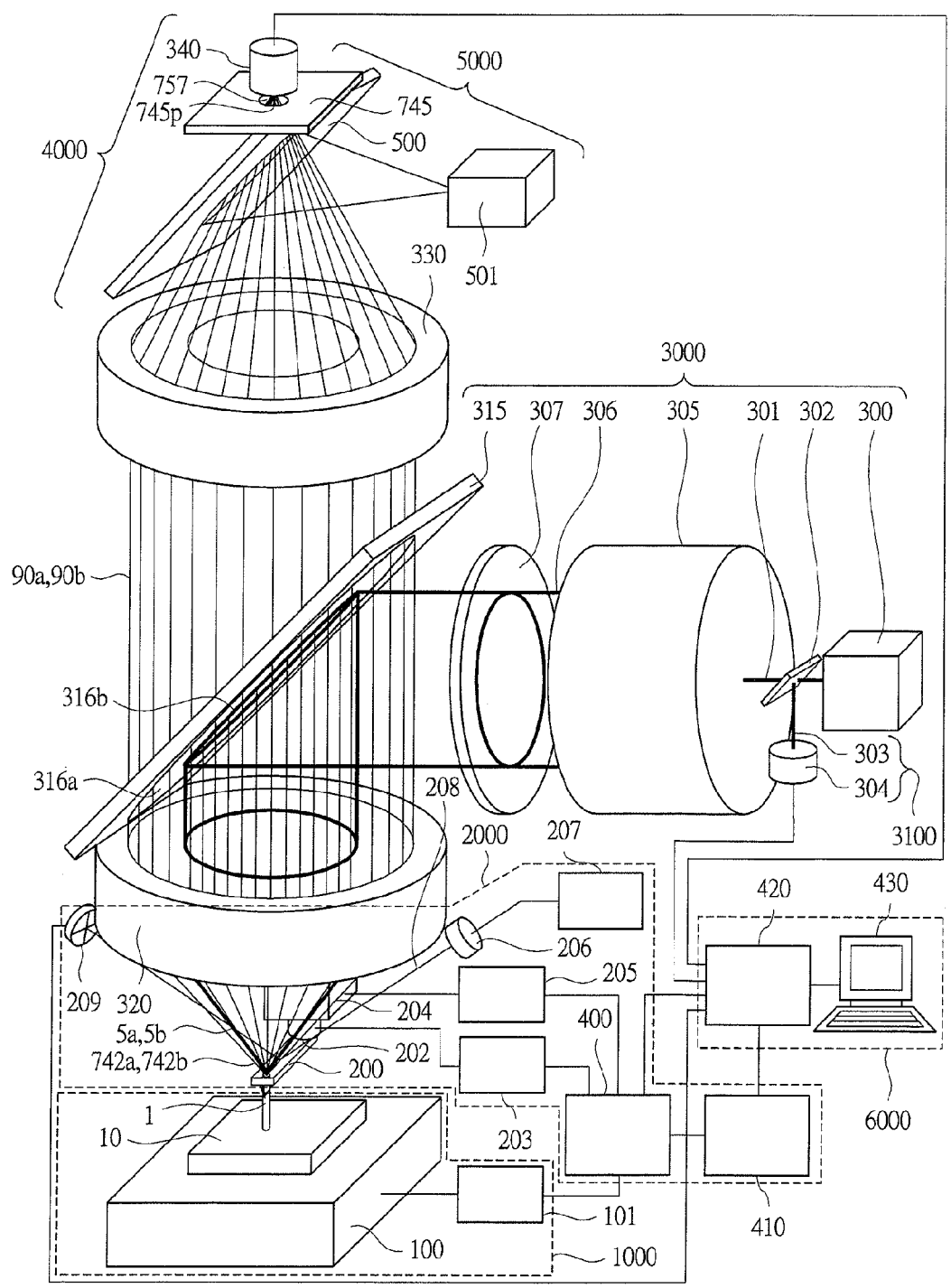
FIG. 14 is a block diagram illustrating a schematic configuration of the measuring unit according to the first embodiment of the present invention and a scanning probe microscope in a second modification example of the detection optical system.

On the other hand, a part of the near-field light 8 interacting with the surface structure of the sample 10 reversely propagates again on the same path as surface plasmon 741. In the present modification example, the near-field optical image is obtained by detecting this reverse surface plasmon 741. For example, the reverse surface plasmon 741 is re-coupled with the gold dots 750a at the incident end portion in the nanotube 1 to generated strong scattered lights 742a and 742b (see FIG. 14) as far-field lights, and therefore, these scattered lights 742a and 742b can be detected. Also, the reverse surface plasmon 741 further propagates to similarly generate the strong scattered lights 742a and 742b as the far-field lights at a corner portion 730c formed by the cantilever 201 and the chip 730, and therefore, these scattered lights 742a and 742b may be detected. FIG. 14 illustrates a configuration of the scanning probe microscope according to the present modification example in which means of detecting these scattered lights are installed. In the scanning probe microscope, other configurations and functions than the detection optical system 4000 are the same with those of the above-described embodiment illustrated in FIG. 7, and therefore, their descriptions are omitted here.

In FIG. 14, the light-shielding plate 745 provided with the pinhole 745p is disposed at a conjugated position (image-forming position) with the gold dots 750a at the incident end portion in the nanotube 1 or at a conjugated position (image-forming position) with the corner portion 730c formed by the cantilever 201 and the chip 730 in front of the photoelectric conversion element 340, so that only the reflection light (far-field light) 757 obtained from the near-field light 8 interacting with the surface structure of the sample 10 can be selectively transmitted, and ambient light from other portions can be shielded.

As illustrated in FIGS. 1 to 3 and 10 described above, according to the present modification example, as well as the AFM image and the near-field optical image can be simultaneously obtained, the near-field light 8 having a spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 at the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved. Also, since the ambient light other than the reflection light of the near-field light 8 interacting with the surface structure of the sample 10 can be suppressed, the near-field optical image with a high S/N ratio can be obtained.

[Second Modification Example of the Detection Optical System 4000]

Figure 15:
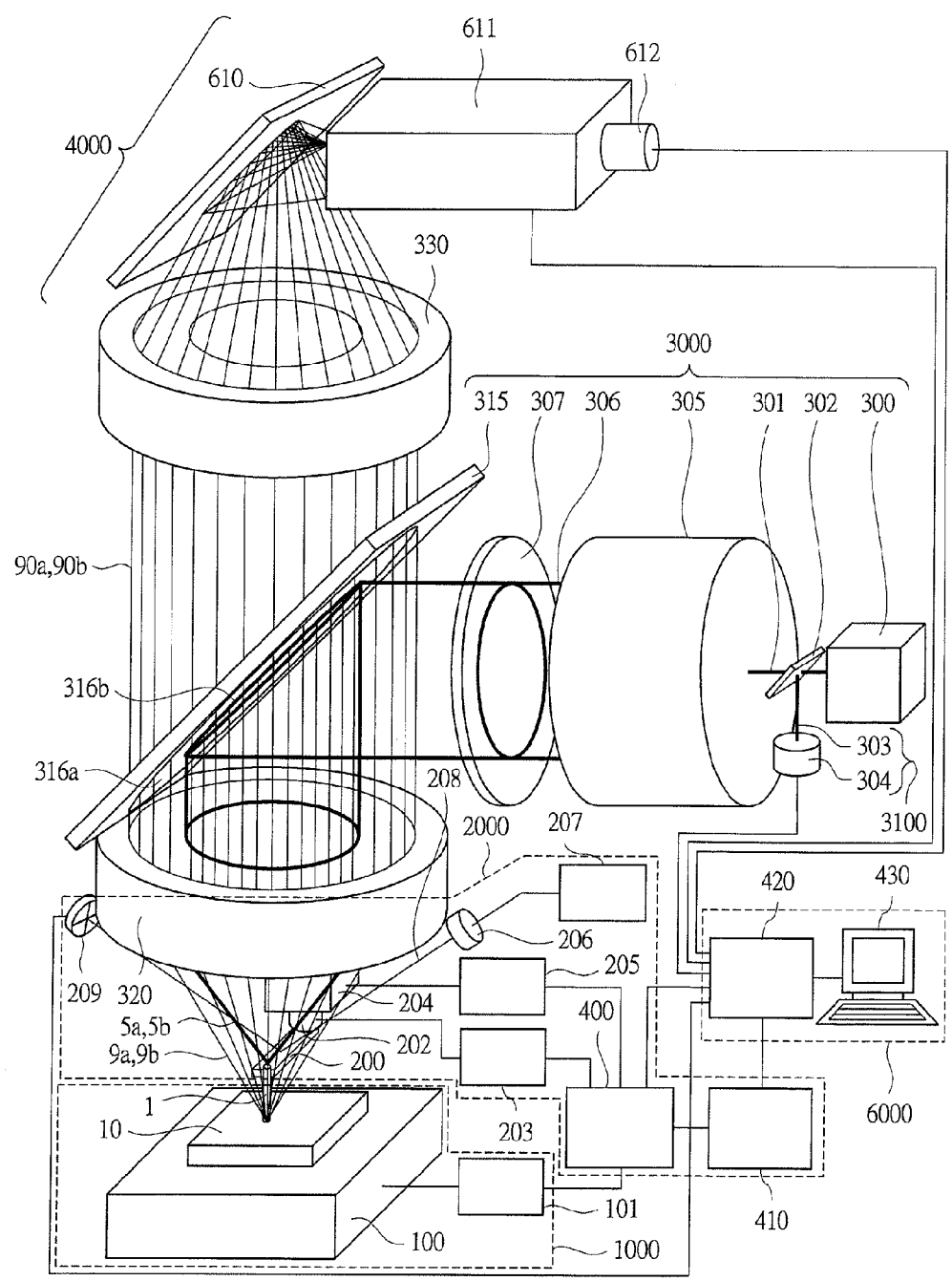
FIG. 15 is a block diagram illustrating a schematic configuration of the scanning probe microscope in the second modification example of the detection optical system according to the first embodiment of the present invention.

A second modification example of the detection optical system 4000 according to the present embodiment is described with reference to FIG. 15. FIG. 15 illustrates a configuration of a scanning probe microscope according to the present modification example. Although a basic structure and functions of the scanning probe microscope are the same with those of the scanning probe microscope according to the above-described embodiment illustrated in FIG. 7, the present modification example has a different point that a spectroscope 611 is disposed at a portion of detecting the near-field light. That is, the near-field light 8 emitted from the bottom end portion in the nanotube 1 and reflected on the sample 10 is converted to the far-field lights 9a and 9b to become the collimated lights 90a and 90b by the objective lens 320, and these collimated lights 90a and 90b are collected on an incident surface of the spectroscope 611 via a mirror 610 by the image-forming lens 330.

In the spectroscope 611, light having a desired wavelength among the far-field lights is selected based on a control signal from the entire control unit 420, and is collected onto a light-receiving surface of a photoelectric conversion element 612 such as a photodiode or a photomultiplier tube to be photoelectrically converted. A detection signal for this is sent to the entire control unit 420 to form a two-dimensional near-field optical image having a specific wavelength. While the same wavelength with the wavelength of the incident laser light is detected in the above-described embodiment illustrated in FIG. 7 and its modification examples, near-field light which is wavelength-shifted from the incident laser light can be detected in the present modification example. For example, stress distribution of a micro area of a semiconductor device using strained silicon can be imaged with a resolution of nanometers by employing Raman spectrometry. In this case, in order to prevent a Raman shift due to the occurrence of a minimal deformation in the sample itself caused by the contact of the nanotube 1, the contact force between the nanotube 1 and the sample 10 is desirably set to the order of pN to sub-nN or smaller.

Also, by using a light source such as an LED having a broad wavelength band in place of the semiconductor laser 300, a two-dimensional near-field optical image having an arbitrary wavelength within the wavelength band can be detected. Further, by changing the spectroscope 611 to the one of full-wavelength detection type with using an array sensor such as a CCD one-dimensional sensor, a two-dimensional near-field spectroscopic optical image can be obtained, so that spectrometry of the sample 10 is possible with a resolution of nanometers.

Similarly to the above-described embodiment illustrated in FIG. 7 and its modification examples, according to the present modification example, as well as the AFM image and the near-field optical image can be simultaneously obtained, the near-field light 8 can be always stably generated, and further, the near-field light 8 can be stably detected. As a result, the resolution of the two-dimensional near-field optical image can be improved, and image reproducibility can be dramatically improved. Further, the two-dimensional near-field spectroscopic optical image can be detected with a resolution on the order of nanometers, so that the spectrometry of the sample 10 is possible with the resolution of nanometers.

[Third Modification Example of the Detection Optical System 4000]

Figure 16:
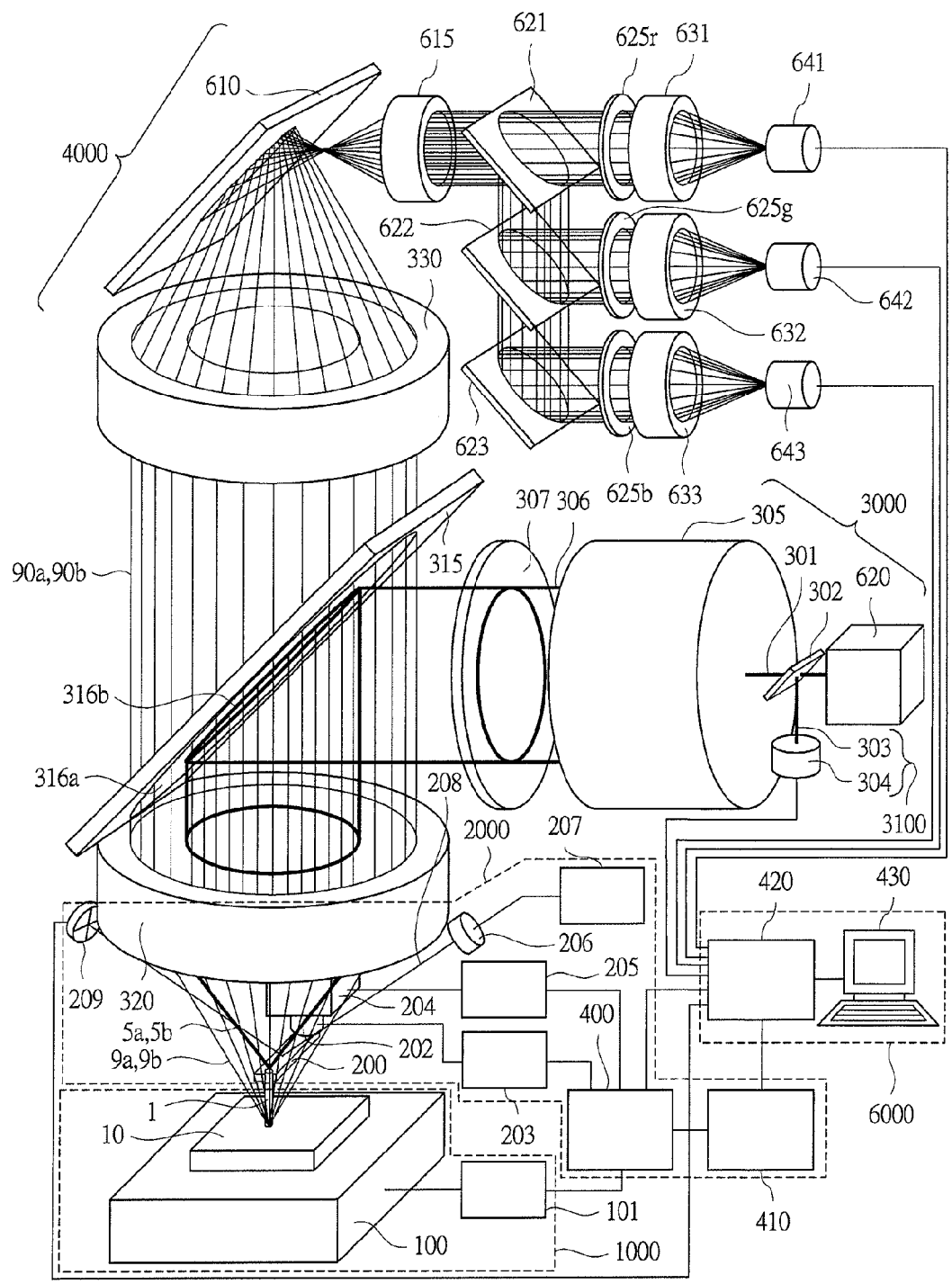
FIG. 16 is a block diagram illustrating a schematic configuration of a scanning probe microscope in a third modification example of the detection optical system according to the first embodiment of the present invention.

A third modification example of the detection optical system 4000 according to the present embodiment is described with reference to FIG. 16. In FIG. 16, a white-light laser 620 emitting three-color lights having wavelengths of about 630 nm, 520 nm, and 430 nm is used as a light source, and interference filters 625r, 625g, and 625b for color separation are disposed at a detecting portion for the near-field light. The near-field light 8 is generated between the nanotube 1 and the sample 10 by laser light emitted from the white-light laser 620, and its reflection light transmits through the objective lens 320 and the beam splitter 315 as the far-field lights 9a and 9b to reach the image-forming lens 330, and the processes up to here are the same with those of the above-described embodiment with reference to FIG. 7.

The collimated lights 90a and 90b reaching the image-forming lens 330 are collected via the mirror 610 by the image-forming lens 330, and then, become collimated lights at a relay lens 615, and further, light having a wavelength of 630 nm is extracted by a dichroic mirror 621 (transmitting light having a wavelength of 600 nm or longer and reflecting the shorter) and the interference filter 625r (having a transmission central wavelength of 630 nm). This light is collected by a collective lens 631 onto a light-receiving surface of a photoelectric conversion element 641 such as a photodiode or a photomultiplier tube to be photoelectrically converted. Among the lights reflected by the dichroic mirror 621, light having a wavelength of 520 nm is extracted by a dichroic mirror 622 (reflecting light having a wavelength of 480 nm or longer and transmitting the shorter) and the interference filter 625g (having a transmission central wavelength of 520 nm). This light is collected by a collective lens 632 onto a light-receiving surface of a photoelectric conversion element 642 such as a photodiode or a photomultiplier tube to be photoelectrically converted. The transmitted light through the dichroic mirror 622 is reflected by a mirror 623, and then, light having a wavelength of 430 nm is extracted by the interference filter 625b (having a transmission central wavelength of 430 nm). This light is collected by a collective lens 633 onto a light-receiving surface of a photoelectric conversion element 643 such as a photodiode or a photomultiplier tube to be photoelectrically converted.

Detection signals of three wavelengths are sent to the entire control unit 420 to form two-dimensional near-field optical images at three wavelengths. Also, by combining these three-wavelength signals, a color image with a resolution of nanometers can be generated.

According to the present modification example, as well as the AFM image and the near-field optical image can be simultaneously obtained, the near-field light 8 can always be stably generated, and further, the near-field light 8 can be stably detected. As a result, the resolution of the two-dimensional near-field optical image can be improved, and the image reproducibility can be dramatically improved. Further, according to the present modification example, for example, defect review for defect classification in semiconductor manufacturing process currently by using only monochrome images detected by an SEM (scanning electron microscope) can be performed from AFM images and color images with a resolution of nanometers, so that defect classification accuracy is significantly improved.

[First Modification Example of the Measuring Unit 2000]

Figure 17:
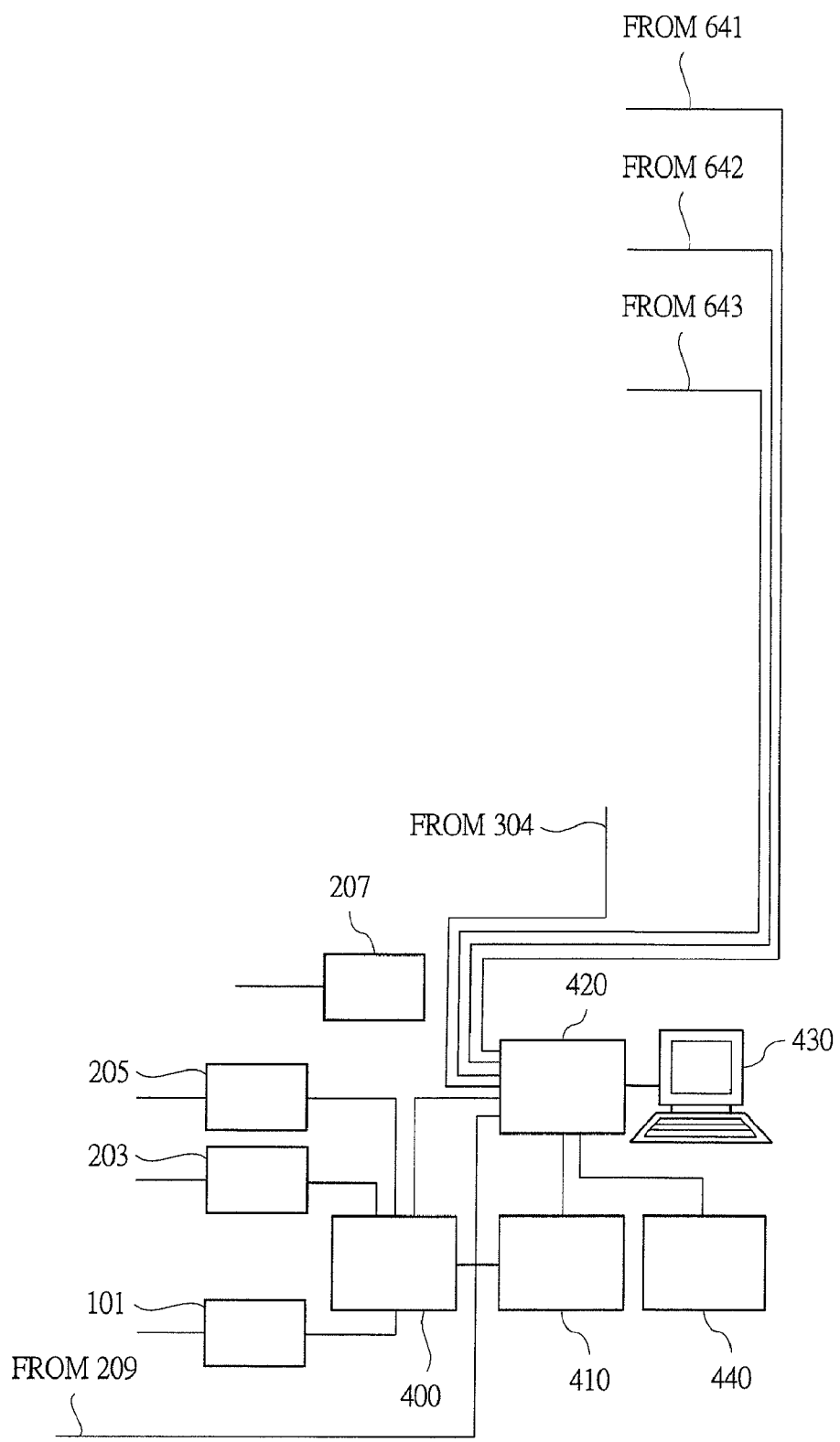
FIG. 17 is a block diagram illustrating a schematic configuration of a scanning probe microscope in a first modification example of the measuring unit according to the first embodiment of the present invention.

A first modification example of the measuring unit 2000 according to the present embodiment is described with reference to FIGS. 17 to 19. FIG. 17 illustrates a changed portion of the measuring unit 2000 according to the present embodiment. This configuration has the above-described configuration illustrated in FIG. 16 and further has a memory unit 440 in which a data set of semiconductor materials with respect to spectral reflectivities showed in a table 441 of FIG. 18 is stored (in FIG. 17, common units with those of the configuration in FIG. 16 described above are significantly omitted). That is, as illustrated in FIG. 18, combined data of reflection-light intensities $(I_{11}, I_{21}, I_{31})$, $(I_{12}, I_{22}, I_{32})$, $(I_{13}, I_{23}, I_{33})$ ... for various materials such as Si and $S_iO_2$ used in semiconductors with respect to respective light-source wavelengths $\lambda_1=630$ nm, $\lambda_2=520$ nm, and $\lambda_3=430$ nm are previously stored in the memory unit 440, and the intensities of detected light at three wavelengths are matched to those in the table 441, so that the materials forming the sample 10 can be discriminated with a nanometer spatial resolution. As a matter of course, the number of wavelengths is not limited to three, and the material-analysis accuracy is improved as increasing the number of wavelengths to four, five, and more.

Figure 19:
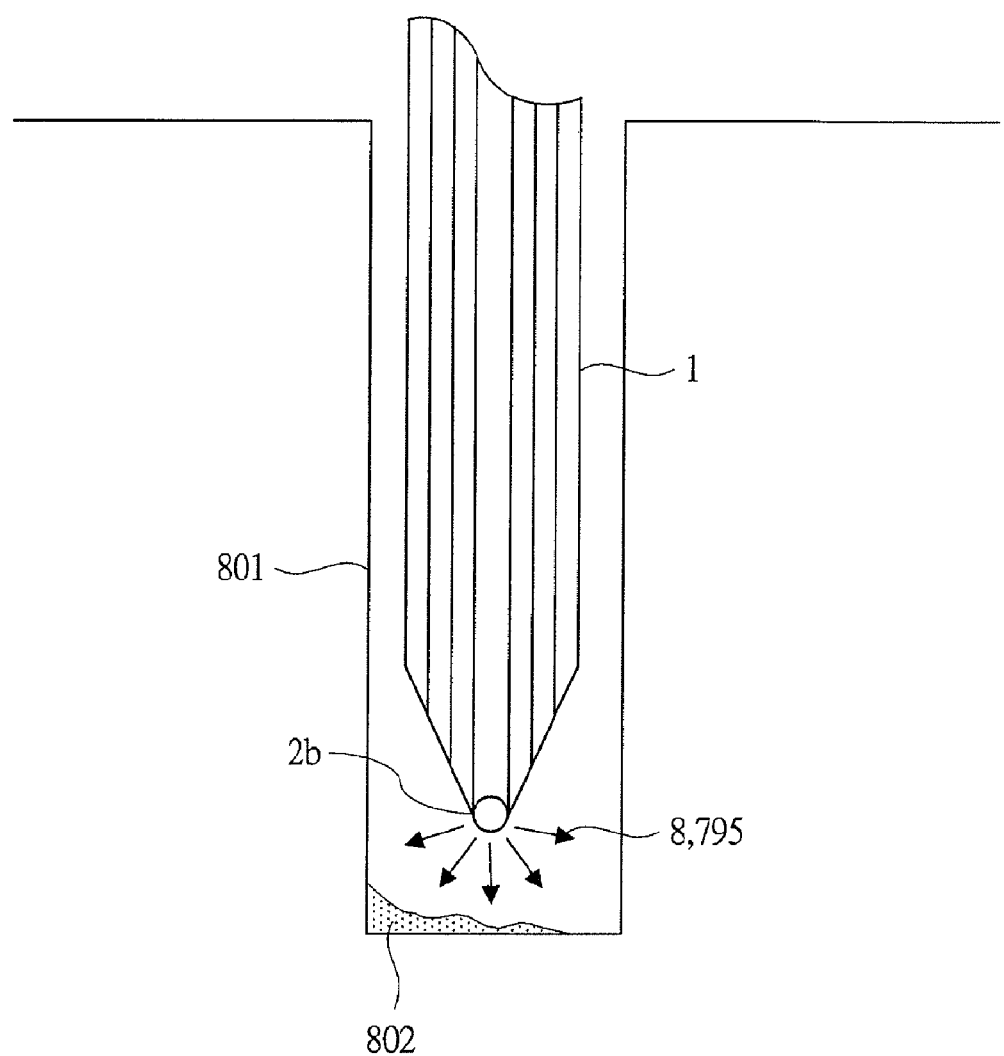
FIG. 19 is cross-sectional views of a deep hole and a front surface of a plasmon-enhanced near-field probe illustrating a case that the scanning probe microscope in the first modification example of the measuring unit according to the first embodiment of the present invention is employed for detection of a residual film on a bottom of the deep hole such as a contact hole.

FIG. 19 illustrates an example that the scanning probe microscope according to the present modification example is employed for detection of a residual film on a bottom of a deep hole such as a contact hole. The nanotube 1 is inserted inside a contact hole 801 having a diameter of about 30 nm, spectral signals at a moment of contacting with the hole bottom with a low contact force is obtained, and the spectral signals are matched to a relation between a film thickness and a spectral intensity previously stored in the memory unit 440, so that presence or absence information of the residual film 802 and its material information can be obtained.

According to the present modification example, as well as the AFM image and the near-field optical image can be simultaneously obtained, the near-field light 8 can be always stably generated, and further, the near-field light 8 can be stably detected. As a result, the resolution of the two-dimensional near-field optical image can be improved, and the image reproducibility can be dramatically improved. Further, according to the present modification example, the material analysis with the resolution of nanometers, analysis of minimal foreign particles whose dimensions are on the order of nanometers, and their contamination analysis become possible.

[Second Modification Example of the Measuring Unit 2000]

Figure 20:
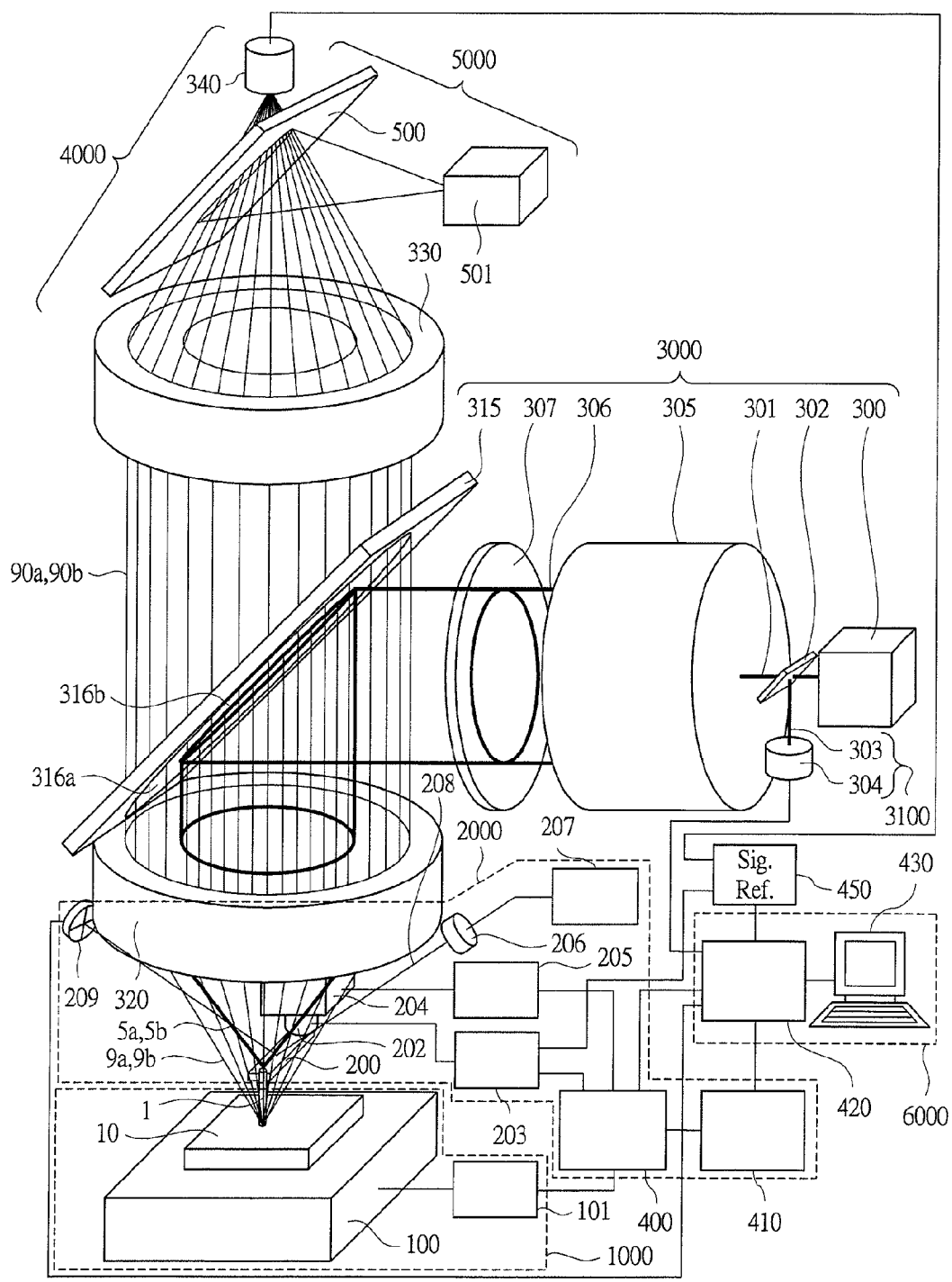
FIG. 20 is a block diagram illustrating a schematic configuration of a scanning probe microscope in a second modification example of the measuring unit according to the first embodiment of the present invention.

A second modification example of the measuring unit 2000 according to the present embodiment is described with reference to FIG. 20. FIG. 20 illustrates a configuration of a scanning probe microscope according to the present modification example. Although a basic structure and functions of the scanning probe microscope according to the present modification example are the same with those of the scanning probe microscope according to the above-described embodiment illustrated in FIG. 7, the present modification example has a different point that the cantilever 201 is microvibrated in the Z direction. The piezoelectric element actuator 202 is driven by the driver 203 to microvibrate the cantilever 201 in the Z direction at a constant frequency f, so that the near-field lights 8 and 795 are subjected to intensity modulation. With using a driving signal at the constant frequency f as a reference signal, only a component of the frequency f is extracted in a lock-in amplifier 450 from the detection signal of the photoelectric conversion element 340, so that information of the near-field lights 8 and 795 can be sensitively detected. An output signal from the lock-in amplifier 450 is sent to the entire control unit 420. The subsequent processes are the same with those of the scanning probe microscope according to the above-described embodiment illustrated in FIG. 7.

According to the present modification example, as well as the AFM image and the near-field optical image can be simultaneously obtained, the near-field light 8 having a spot diameter of 4 nm can be always stably generated between the sample 10 and the gold nano-particles 2b at the bottom end portion in the nanotube 1, and further, the near-field light 8 can be stably detected by detecting the near-field light 8 at the moment when this nanotube 1 contacts with the sample 10 with a low contact force, that is, when the gold nano-particles 2b contact with the sample 10. As a result, the resolution of the two-dimensional near-field optical image can be improved, and the image reproducibility can be dramatically improved. Also, by the lock-in-detection of the near-field light 8, a near-field optical image with a high S/N ratio can be obtained.

Second Embodiment

Figure 21:
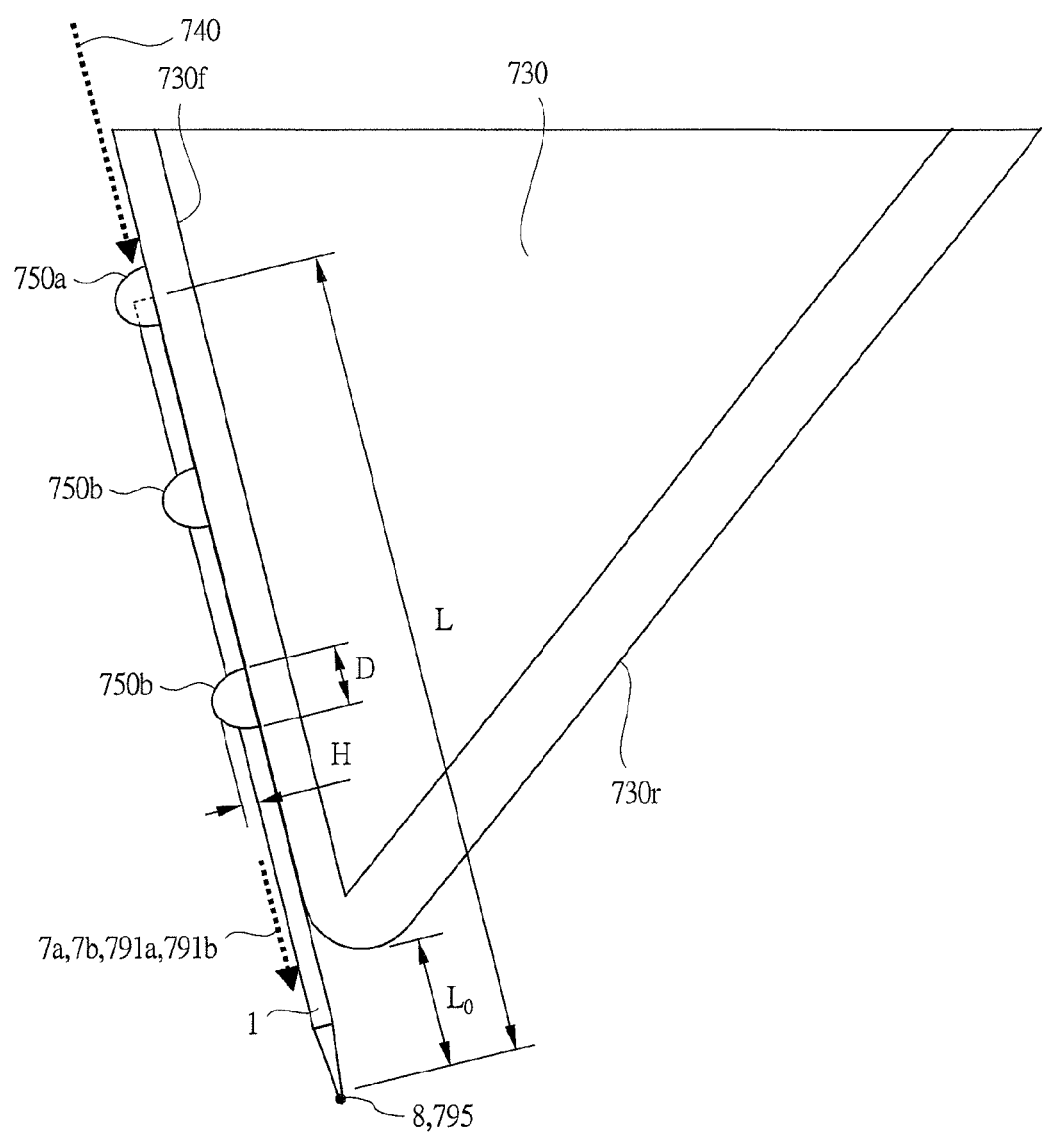
FIG. 21 is a cross-sectional view illustrating a method of fixing a nanotube to a chip and a principle of guiding an excited TM mode plasmon to a nanotube in a plasmon exciting unit according to a second embodiment of the present invention.

A second embodiment according to the present invention is described with reference FIG. 21. FIG. 21 illustrates, in the plasmon exciting unit 200 according to the present embodiment, a method of fixing the nanotube 1 to the chip 730 and a principle of guiding the excited TM mode plasmon 740 toward the nanotube 1. In the plasmon exciting unit according to the first embodiment described above, three gold dots 750a are formed by the irradiation of electron beams, and these gold dots are used as a binder to be melted to adhere the nanotube 1 on the tip of the chip 730. Also, in consideration of ensuring sufficient strength for the fixing and achieving the coupling efficiency of the plasmon to the nanotube having a diameter of 20 nm, it is set in the first embodiment described above such that D=40 nm, H=40 nm, and the distance P=250 nm.

In the present embodiment, for the gold dot 750a at the incident end portion in the nanotube 1, it is set such that D=40 nm and H=40 nm in consideration of achieving the coupling efficiency of the plasmon to the nanotube 1 having a diameter of 20 nm. On the other hand, for the left two dots, while it is set such that D=40 nm and H=40 nm, the two dots are dielectric dots 750b whose material is a dielectric body in order to minimize plasmon loss in these dots. For example, $SiO_2$, $Si_3N_4$, or tungsten (W) having a low metal property is used for the dielectric dots 750b. Each distance P among the three dots is set to be P=250 nm.

In this manner, the TM mode plasmon 740 is efficiently coupled with the gold nano-particles 2a at the incident end portion in the nanotube 1 or the top end portion of the gold nano-rod 702 in the nanotube 1 illustrated in FIGS. 1 to 3 described above. Also, the plasmon loss and unnecessary scattering in the two dielectric dots 750b can be suppressed in the propagation process of the TM mode plasmon 740 from the top end portion to the bottom end portion through the gold nano-particles 2c and 2b filled in the surface side and the inside of the nanotube 1, or the gold nano-rod 702 in the nanotube 1 as illustrated by the dashed arrows 7a and 7b. As a result, the near-field light 8 can be finally efficiently outputted from the bottom end portion in the nanotube 1.

The configuration and functions of the scanning probe microscope in which the plasmon exciting unit 200 is installed are the same with those of the first embodiment illustrated in FIG. 7, and therefore, their descriptions are omitted here.

According to the present embodiment, similarly to the first embodiment described above, as illustrated in FIGS. 1 to 3 and 10 described above, as well as the AFM image and the near-field optical image can be simultaneously obtained, the near-field light 8 having a spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 at the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved.

Third Embodiment

Figure 22:
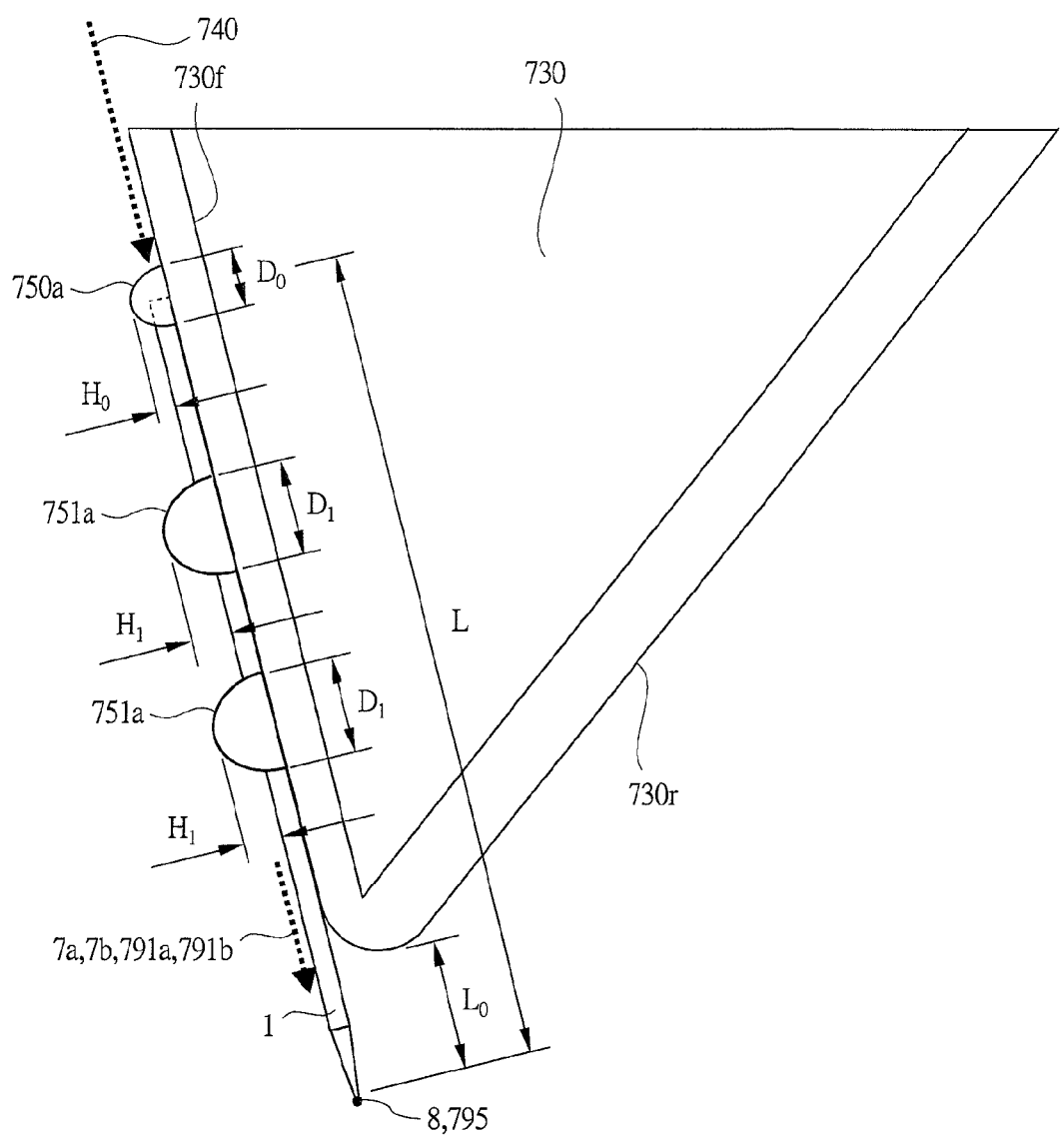
FIG. 22 is a cross-sectional view illustrating a method of fixing a nanotube to a chip and a principle of guiding an excited TM mode plasmon to a nanotube in a plasmon exciting unit according to a third embodiment of the present invention.

A third embodiment according to the present invention is described with reference FIG. 22. FIG. 22 illustrates, in the plasmon exciting unit 200 according to the present embodiment, a method of fixing the nanotube 1 to the chip 730 and a principle of guiding the excited TM mode plasmon 740 toward the nanotube 1. In the plasmon exciting unit according to the first embodiment described above, three gold dots 750a are formed by the irradiation of electron beams, and these gold dots are used as a binder to be melted to adhere the nanotube 1 on the tip of the chip 730. Also, in consideration of ensuring sufficient strength for the fixing and achieving the coupling efficiency of the plasmon to the nanotube having a diameter of 20 nm, it is set in the first embodiment described above such that D=40 nm, H=40 nm, and the distance P=250 nm.

In the present embodiment, for the gold dot 750a at the incident end portion in the nanotube 1, it is set such that $D_0$=40 nm and $H_0$=40 nm in consideration of achieving the coupling efficiency of the plasmon to the nanotube 1 having a diameter of 20 nm. On the other hand, for the left two dots 751a, while it is set such that their dimensions are extremely larger than the diameter of 20 nm of the nanotube 1 in order to minimize plasmon loss in these dots. For example, it is set such that $D_1$=200 nm and $H_1$=200 nm.

In this manner, the TM mode plasmon 740 is efficiently coupled with the gold nano-particles 2a at the incident end portion in the nanotube 1 or the top end portion of the gold nano-rod 702 in the nanotube 1 illustrated in FIGS. 1 to 3 described above. Also, the plasmon loss in the two gold dots 751a can be suppressed in the propagation process of the TM mode plasmon 740 from the top end portion to the bottom end portion through the gold nano-particles 2c and 2b filled in the surface side and the inside of the nanotube 1, or the gold nano-rod 702 in the nanotube 1 as illustrated by the dashed arrows 7a and 7b. As a result, the near-field light 8 can be finally efficiently outputted from the bottom end portion in the nanotube 1.

The configuration and functions of the scanning probe microscope in which the plasmon exciting unit 200 is installed are the same with those of the first embodiment illustrated in FIG. 7, and therefore, their descriptions are omitted here.

According to the present embodiment, similarly to the first embodiment described above, as illustrated in FIGS. 1 to 3 and 10 described above, as well as the AFM image and the near-field optical image can be simultaneously obtained, the near-field light 8 having a spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 at the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved.

Fourth Embodiment

A fourth embodiment according to the present invention is described with reference FIGS. 23 and 24. FIG. 23 illustrates, in the plasmon exciting unit 200 according to the present embodiment, a method of fixing the nanotube 1 to the chip 730 and a principle of guiding the excited TM mode plasmon 740 toward the nanotube 1. In the plasmon exciting unit according to the first embodiment described above, three gold dots 750a are formed by the irradiation of electron beams, and these gold dots are used as a binder to be melted to adhere the nanotube 1 on the tip of the chip 730. Also, in consideration of ensuring sufficient strength for the fixing and achieving the coupling efficiency of the plasmon to the nanotube having a diameter of 20 nm, it is set in the first embodiment described above such that D=40 nm, H=40 nm, and the distance P=250 nm.

In the present embodiment, for the gold dot 750a at the incident end portion in the nanotube 1, it is set such that D=40 nm and H=40 nm in consideration of achieving the coupling efficiency of the plasmon to the nanotube 1 having a diameter of 20 nm. On the other hand, for the left gold dot 750a or the dielectric dot (tungsten dot) 750b, they are disposed in consideration of positions of nodes (weak-amplitude portions) and anti-nodes (strong-amplitude portions) of a standing wave of the plasmon caused inside the nanotube 1. That is, as described in the first embodiment, in the probe, the plasmon from the top end portion toward the bottom end portion in the nanotube 1 interferes with plasmon reflected in a reverse direction to the plasmon to cause the standing wave, and the nodes (weak-amplitude portions) and the anti-nodes (strong-amplitude portions) are generated.

FIG. 24 illustrates an electric-field distribution in a vicinity of the inside and surface of the carbon nanotube 1 obtained by a computer simulation when a point light source having a wavelength of 886 nm is disposed at the top end portion in the nanotube (carbon nanotube) 1 having an outer diameter of 20 nm in which gold nano-particles each having a diameter of 4 nm are filled. As illustrated in an enlarged view 870, it is found that the near-field light whose dimension is almost the same with those of the gold nano-particles is caused at the bottom end portion in the carbon nanotube 1. On the other hand, it is found that there is a node 880 of the plasmon standing wave where the electric field intensity is decreased in a vicinity of a portion positioned about ⅔ away from the top end portion of the carbon nanotube 1. That is, by forming the gold dot 750a or the dielectric dot (tungsten dot) 750b at the position where this node 880 exists (away from the top end portion by a distance P), the plasmon loss and unnecessary scattering on the dot 750a or 750b can be suppressed. The dimension of the dot 750a or 750b is set to be D=40 nm and H=40 nm which are the same with those of the gold dot 750a at the incident end portion in the nanotube 1, and gold, a dielectric material such as $SiO_2$ or $Si_3N_4$, tungsten (W) having a low metal property, or others is used as their materials.

In this manner, the TM mode plasmon 740 is efficiently coupled with the gold nano-particles 2a at the incident end portion in the nanotube 1 or the top end portion of the gold nano-rod 702 in the nanotube 1 illustrated in FIGS. 1 to 3 described above. Also, the plasmon loss and unnecessary scattering in the dots 750a and 750b can be suppressed in the propagation process of the TM mode plasmon 740 from the top end portion to the bottom end portion through the gold nano-particles 2c and 2b filled in the surface side and the inside of the nanotube 1, or the gold nano-rod 702 in the nanotube 1 as illustrated by the dashed arrows 7a and 7b. As a result, the near-field light 8 can be finally efficiently outputted from the bottom end portion in the nanotube 1.

The configuration and functions of the scanning probe microscope in which the plasmon exciting unit 200 is installed are the same with those of the first embodiment illustrated in FIG. 7, and therefore, their descriptions are omitted here.

According to the present embodiment, similarly to the first embodiment described above, as illustrated in FIGS. 1 to 3 and 10 described above, as well as the AFM image and the near-field optical image can be simultaneously obtained, the near-field light 8 having a spot diameter of 4 nm can be always stably generated between the sample 10 and the gold nano-particles 2b exposed on the bottom end portion in the nanotube 1 or the bottom end portion of the gold nano-rod 702 in the nanotube 1, and further, the near-field light 8 can be stably detected by detecting the near-field light 8 at the moment when this nanotube 1 contacts with the sample 10 with a low contact force, that is, when the gold nano-particles 2b or the bottom end portion of the gold nano-rod 702 contacts with the sample 10. As a result, the resolution of the two-dimensional near-field optical image can be improved, and the image reproducibility can be dramatically improved.

Effects of the First to Fourth Embodiments

As described above, according to the present embodiments, it is possible to achieve a scanning probe microscope measurable for optical information, spectral information, and profile information of the surface of the sample with an optical resolution on the order of nanometers, a high S/N ratio, and a high reproducibility without damaging both of the probe and the sample, together with an AFM. As a result, physical property information, spectral information, and surface profile information such as stress distribution and impurity distribution of semiconductor samples can be measured. Also, optical information and profile information contributing to classification of foreign particles and defects can be measured, and therefore, a foreign-particle and defect classifying performances are improved. Further, material analysis with a resolution of nanometers, analysis of minimal foreign particles whose dimensions are on the order of nanometers, and analysis of their contamination are possible. By feeding back these measurement results to the semiconductor manufacturing process, high-yield production of a highly-reliable semiconductor device becomes possible.

In the foregoing, the invention made by the inventors of the present invention has been concretely described based on the embodiments. However, it is needless to say that the present invention is not limited to the foregoing embodiments and various modifications and alterations can be made within the scope of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A scanning probe microscope comprising:
    a measuring probe configured to enable a plasmon excited by irradiation of laser light to propagate therethrough;
    a cantilever configured to support the measuring probe;
    a driving unit configured to drive the cantilever to scan a test-target sample with the measuring probe; and
    a near-field optical image obtaining unit configured to generate near-field light between the measuring probe and a surface of the test-target sample by the plasmon propagating through the measuring probe, in order to obtain a near-field optical image of the surface of the test-target sample.

2. The scanning probe microscope according to claim 1, further comprising:
    an atomic force microscopic image generating unit configured to process a signal, the signal obtained by a displacement detecting unit by detecting the deformation of the cantilever, to generate an atomic force microscopic image of the surface of the test-target sample.

3. The scanning probe microscope according to claim 1, wherein the near-field optical image obtaining unit includes:
    a plasmon exciting unit configured to excite plasmon at one end of the measuring probe;
    a near-field light detection optical system configured to detect the near-field light caused between the other end of the measuring probe and the surface of the test-target sample by an approach of the other end of the measuring probe to the surface of the test-target sample in the excited plasmon state by the plasmon exciting unit; and
    a near-field optical image processing system configured to obtain the near-field optical image of the surface of the test-target sample by processing a signal obtained by detecting the near-field light by the near-field light detection optical system.

4. The scanning probe microscope according to claim 3, wherein a length of the measuring probe is adjusted so that near-field light having a maximum intensity is obtained in accordance with a wavelength of the plasmon.

5. The scanning probe microscope according to claim 3, wherein
the plasmon exciting unit is configured to excite plasmon at one end of the measuring probe by fixing the measuring probe to the cantilever by using at least one structure or more having the same diameter with that of the measuring probe, irradiating light to the cantilever to excite plasmon, and coupling the plasmon with the measuring probe.

6. The scanning probe microscope according to claim 3, wherein the plasmon exciting unit is configured to excite plasmon having a plurality of wavelengths at one end of the measuring probe by using a laser oscillating a plurality of wavelengths as a light source;
wherein the near-field light detection optical system wavelength-divides and detects the near-field light caused between the other end of the measuring probe and the surface of the test-target sample; and
wherein the near-field optical image processing system processes and combines each signal detected by the wavelength division to obtain a color near-field optical image of the surface of the test-target sample.

7. The scanning probe microscope according to claim 1, wherein the measuring probe is formed of a nanotube including carbon or metal, and
wherein at least one gold particles, silver particles, gold rod, or silver rod is embedded inside a portion of the nanotube.

8. The scanning probe microscope according to claim 1, wherein the measuring probe is formed of a nanotube including carbon or metal;
wherein a tip portion of the nanotube approaching to the surface of the test-target sample is sharpened; and
wherein gold particles or silver particles are embedded inside the tip portion.

9. A method of observing a sample with using a scanning probe microscope, comprising the steps of:
driving a cantilever to scan a test-target sample with a measuring probe, the cantilever supporting the measuring probe;
irradiating laser light to the measuring probe to excite a plasmon;
causing the plasmon excited by the irradiation of the laser light to propagate through the measuring probe;
generating near-field light by interaction between a surface of the test-target sample and the plasmon propagating through the measuring probe; and
obtaining a near-field optical image of a surface of the test-target sample by using the measuring probe.

10. The method of observing a sample with using a scanning probe microscope according to claim 9, further comprising:
processing a signal, obtained by detecting the deformation of the cantilever, to generate an atomic force microscopic image of the surface of the test-target sample.

11. The method of observing a sample with using a scanning probe microscope according to claim 9, wherein the near-field optical image is obtained by:
exciting plasmon at one end of the measuring probe;
detecting near-field light caused between the other end of the measuring probe and the surface of the test-target sample by approach of the other end of the measuring probe to the surface of the test-target sample in the excited plasmon state; and
processing a signal obtained by detecting the near-field light.

12. The method of observing a sample with using a scanning probe microscope according to claim 11, further comprising:
adjusting a length of the measuring probe so that near-field light having a maximum intensity is obtained in accordance with a wavelength of the plasmon.

13. The method of observing a sample with using a scanning probe microscope according to claim 11, further comprising:
exciting the plasmon at one end of the measuring probe by:
fixing the measuring probe to the cantilever by using at least one structure or more having the same diameter with that of the measuring probe;
irradiating light to the cantilever to excite the plasmon; and
coupling the plasmon with the measuring probe.

14. The method of observing a sample with using a scanning probe microscope according to claim 11,
wherein exciting plasmon at one end of the measuring probe is performed by using a laser oscillating a plurality of wavelengths as a light source, and
further comprising:
wavelength-dividing and detecting the near-field light caused between the other end of the measuring probe and the surface of the test-target sample; and
processing a signal obtained by wavelength division and the detection, to obtain a color near-field optical image of the surface of the test-target sample.

15. The method of observing a sample with using a scanning probe microscope according to claim 9,
wherein the near-field light is detected by using a measuring probe including a nanotube, the nanotube including carbon or metal.

16. The method of observing a sample with using a scanning probe microscope according to claim 9,
wherein the measuring probe is formed of a nanotube including carbon or metal;
wherein a tip portion of the nanotube approaching to the surface of the test-target sample is sharpened; and
wherein gold particles or silver particles are embedded inside the tip portion.

* * * * *